United States Patent
Shuck et al.

(10) Patent No.: US 11,976,569 B2
(45) Date of Patent: May 7, 2024

(54) FUSED FILAMENT FABRICATION OF ABRADABLE COATINGS

(71) Applicants: Rolls-Royce Corporation, Indianapolis, IN (US); Rolls-Royce North American Technologies, Inc., Indianapolis, IN (US)

(72) Inventors: Quinlan Yee Shuck, Indianapolis, IN (US); Scott Nelson, Carmel, IN (US); Raymond Ruiwen Xu, Carmel, IN (US); Brandon David Ribic, Noblesville, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 155 days.

(21) Appl. No.: 17/096,227

(22) Filed: Nov. 12, 2020

(65) Prior Publication Data
US 2021/0148239 A1  May 20, 2021

Related U.S. Application Data

(60) Provisional application No. 62/935,377, filed on Nov. 14, 2019.

(51) Int. Cl.
*F01D 5/28* (2006.01)
*B29C 64/165* (2017.01)
(Continued)

(52) U.S. Cl.
CPC ............ *F01D 5/288* (2013.01); *B29C 64/165* (2017.08); *B29C 64/245* (2017.08); *B33Y 80/00* (2014.12);
(Continued)

(58) Field of Classification Search
CPC ........ F01D 5/288; F01D 11/122; F01D 11/02; B29C 64/165; B29C 64/245; B33Y 10/00;
(Continued)

(56) References Cited

U.S. PATENT DOCUMENTS

| | | | |
|---|---|---|---|
| 4,346,904 | A | 8/1982 | Watkins, Jr. |
| 4,466,772 | A | 8/1984 | Okapuu et al. |

(Continued)

FOREIGN PATENT DOCUMENTS

| | | |
|---|---|---|
| CN | 103980681 A | 8/2014 |
| DE | 102016110337 A1 | 12/2017 |

(Continued)

OTHER PUBLICATIONS

U.S. Appl. No. 16/144,235, filed Sep. 27, 2018, by Sippel et al.

(Continued)

*Primary Examiner* — S. Behrooz Ghorishi
(74) *Attorney, Agent, or Firm* — Shumaker & Sieffert, P.A.

(57) ABSTRACT

In general, techniques are described for fused filament fabrication of abradable coatings. An additive manufacturing system comprising a substrate defining a major surface, a filament delivery device, and a computing device may be configured to perform various aspects of the techniques. The computing device may be configured to control the filament delivery device to deposit a filament on the substrate, the filament including a powder and a binder, wherein the binder is configured to be substantially removed from the filament and the powder includes a metal or alloy configured to be sintered to form an abradable layer.

16 Claims, 8 Drawing Sheets

(51) Int. Cl.
*B29C 64/245* (2017.01)
*B33Y 10/00* (2015.01)
*B33Y 30/00* (2015.01)
*B33Y 80/00* (2015.01)

(52) U.S. Cl.
CPC .............. *B33Y 10/00* (2014.12); *B33Y 30/00* (2014.12); *F05D 2230/31* (2013.01); *F05D 2230/90* (2013.01)

(58) Field of Classification Search
CPC ......... B33Y 30/00; B33Y 80/00; B33Y 70/10; B22F 2998/10; B22F 7/08; B22F 5/009; B22F 10/18; F04C 2230/22; F04C 2230/91; F04C 15/0003; F04C 18/0207; F05D 2230/31; F05D 2230/90; F05D 2230/22; F05D 2300/43; F05D 2300/613; F05D 2300/614; Y02P 10/25; F04D 29/164; F04D 29/526; F05C 2225/00; F05C 2253/04
See application file for complete search history.

(56) References Cited

U.S. PATENT DOCUMENTS

| | | |
|---|---|---|
| 5,951,892 A | 9/1999 | Wolfla et al. |
| 6,102,656 A | 8/2000 | Nissley et al. |
| 6,203,021 B1 | 3/2001 | Wolfla et al. |
| 6,375,880 B1 | 4/2002 | Cooper et al. |
| 6,887,528 B2 | 5/2005 | Lau et al. |
| 7,445,685 B2 | 11/2008 | Deakin et al. |
| 7,686,570 B2 | 3/2010 | Allen |
| 7,686,990 B2 | 3/2010 | Gray |
| 8,501,840 B2 | 8/2013 | Kirby et al. |
| 8,852,720 B2 | 10/2014 | Bolcavage et al. |
| 9,249,680 B2 | 2/2016 | Lee et al. |
| 9,527,242 B2 | 12/2016 | Rodgers et al. |
| 9,598,972 B2 | 3/2017 | Strock |
| 9,713,912 B2 | 7/2017 | Lee |
| 9,797,263 B2 | 10/2017 | Varney et al. |
| 9,925,714 B2 | 3/2018 | Rodgers et al. |
| 10,132,185 B2 | 11/2018 | Gold |
| 10,189,204 B2 | 1/2019 | Fulop et al. |
| 10,190,435 B2 | 1/2019 | Lee et al. |
| 10,870,152 B2 | 12/2020 | Le Biez et al. |
| 2005/0003172 A1 | 1/2005 | Wheeler et al. |
| 2005/0173380 A1 | 8/2005 | Carbone |
| 2006/0110248 A1 | 5/2006 | Nelson et al. |
| 2008/0274336 A1 | 11/2008 | Merrill et al. |
| 2009/0148278 A1* | 6/2009 | Allen .................. F01D 11/127 415/118 |
| 2010/0003894 A1 | 1/2010 | Miller et al. |
| 2010/0320649 A1 | 12/2010 | Niebling |
| 2011/0016717 A1 | 1/2011 | Morrison et al. |
| 2011/0097538 A1 | 4/2011 | Bolcavage et al. |
| 2011/0103940 A1* | 5/2011 | Duval .................. F01D 11/125 156/280 |
| 2012/0107103 A1 | 5/2012 | Kojima et al. |
| 2013/0017072 A1 | 1/2013 | Ali et al. |
| 2014/0154088 A1 | 6/2014 | Etter et al. |
| 2014/0294652 A1 | 10/2014 | Morrison et al. |
| 2014/0367894 A1 | 12/2014 | Kramer et al. |
| 2015/0014885 A1 | 1/2015 | Hofmann et al. |
| 2015/0099087 A1 | 4/2015 | Reznar et al. |
| 2015/0102531 A1 | 4/2015 | El-Siblani et al. |
| 2015/0108095 A1 | 4/2015 | Kruer et al. |
| 2015/0354392 A1* | 12/2015 | Lipkin .................. F01D 11/125 415/173.4 |
| 2015/0354393 A1 | 12/2015 | Lipkin et al. |
| 2016/0024293 A1* | 1/2016 | Nestle .................. B28B 11/243 524/439 |
| 2016/0089720 A1 | 3/2016 | Kamakura et al. |
| 2016/0130969 A1 | 5/2016 | Gold |
| 2016/0236994 A1 | 8/2016 | Vetters et al. |
| 2016/0236995 A1 | 8/2016 | Lai et al. |
| 2016/0281267 A1 | 9/2016 | Wetzel et al. |
| 2016/0305316 A1 | 10/2016 | Shomura et al. |
| 2016/0305319 A1 | 10/2016 | Baldiga et al. |
| 2016/0319688 A1 | 11/2016 | Vetters et al. |
| 2017/0052531 A1 | 2/2017 | Minardi et al. |
| 2017/0120528 A1 | 5/2017 | Tejada Palacios et al. |
| 2017/0165917 A1 | 6/2017 | Mckiel, Jr. |
| 2017/0209923 A1 | 7/2017 | Giovannetti et al. |
| 2017/0225394 A9 | 8/2017 | Rodgers et al. |
| 2017/0259497 A1 | 9/2017 | Prestayko et al. |
| 2017/0297098 A1 | 10/2017 | Myerberg et al. |
| 2017/0297099 A1 | 10/2017 | Gibson et al. |
| 2017/0355138 A1 | 12/2017 | Mark |
| 2017/0370241 A1* | 12/2017 | Tham .................. B22C 9/24 |
| 2018/0106154 A1 | 4/2018 | Baldwin et al. |
| 2018/0162013 A1 | 6/2018 | Fulop et al. |
| 2018/0243830 A1 | 8/2018 | Kottilingam et al. |
| 2018/0297272 A1 | 10/2018 | Preston et al. |
| 2018/0305266 A1 | 10/2018 | Gibson et al. |
| 2018/0326525 A1 | 11/2018 | Ann et al. |
| 2018/0326660 A1 | 11/2018 | Gifford et al. |
| 2018/0370213 A1 | 12/2018 | Gold et al. |
| 2019/0032503 A1 | 1/2019 | Shi et al. |
| 2019/0070664 A1 | 3/2019 | Paniogue et al. |
| 2019/0070778 A1 | 3/2019 | Haid et al. |
| 2019/0093499 A1 | 3/2019 | Sippel et al. |
| 2019/0134971 A1 | 5/2019 | Nielson-Cole et al. |
| 2019/0224911 A1 | 7/2019 | Shuck et al. |
| 2019/0224912 A1 | 7/2019 | Shuck et al. |
| 2019/0344495 A1 | 11/2019 | Shuck et al. |
| 2019/0351485 A1 | 11/2019 | Shuck |
| 2019/0389090 A1 | 12/2019 | Roy-mayhew et al. |
| 2020/0076044 A1 | 3/2020 | Alvarez et al. |
| 2020/0277871 A1 | 3/2020 | Shi et al. |
| 2020/0114420 A1 | 4/2020 | Pu et al. |
| 2020/0189143 A1 | 6/2020 | Brandt et al. |
| 2020/0316684 A1 | 10/2020 | Shuck |
| 2020/0376743 A1* | 12/2020 | Jodet .................. F02C 7/24 |
| 2020/0391292 A1 | 12/2020 | Shuck et al. |
| 2020/0400033 A1 | 12/2020 | Jouy et al. |
| 2021/0060866 A1 | 3/2021 | Nation et al. |

FOREIGN PATENT DOCUMENTS

| | | |
|---|---|---|
| EP | 1108857 A2 | 6/2001 |
| EP | 1905860 A2 | 4/2008 |
| EP | 2354276 A1 | 8/2011 |
| EP | 3218160 A1 | 9/2017 |
| EP | 3276038 A1 | 1/2018 |
| WO | 2015/077536 A1 | 5/2015 |
| WO | 2015/130519 A1 | 9/2015 |
| WO | 2016/012486 A1 | 1/2016 |
| WO | 2016/077473 A1 | 5/2016 |
| WO | 2016/108154 A1 | 7/2016 |
| WO | 2016/125138 A3 | 8/2016 |
| WO | 2016/1251138 A2 | 8/2016 |
| WO | 2017/081160 A1 | 5/2017 |
| WO | 2017/180958 A2 | 10/2017 |
| WO | 2019/110936 A1 | 6/2019 |

OTHER PUBLICATIONS

Frick, "Additive Manufacturing Comes to Metal Foam," Materials, Machine Design, accessed from https://www.machinedesign.com/materials/article/21830512/additive-manufacturing-comes-to-metal-foam, Apr. 26, 2013, 13 pp.

Jakus, "Metallic Architectures from 3D-Printed Powder-Based Liquid Inks," Wiley Library, Advanced Functional Materials, Nov. 2015, 11 pp.

"Lightweight, Composite Metal Foam Stops Bullet," [Abstract only] Materials, Tech Briefs Media Group, retrieved from https://www.techbriefs.com/component/content/article/tb/tv/34642 on Nov. 4, 2019, 1 pp.

Shim et al., "Additive Manufacturing of Porous Metals Using Laser Melting of Ti6Al4V Powder With a Foaming Agent," IOP Publishing, Materials Research Express, vol. 5, Jul. 25, 2018, 10 pp.

(56) References Cited

OTHER PUBLICATIONS

"Abradable Coatings Increase Gas Turbine Engine Efficiency," AZO Materials, accessed from https://www.azom.com/article.aspx?ArticleID=739, Aug. 23, 2001, 7 pp.
Ross et al., "Compressor Seal Selection and Justification," Proceedings of the Thirty-Second Turbomachinery Symposium, 2003 (Applicant points out, in accordance with MPEP 609.04(a), that the year of publication, 2003, is sufficiently earlier than the effective U.S. filing date, so that the particular month of publication is not in issue.) pp. 167-178.
U.S. Appl. No. 17/096,112, filed Nov. 12, 2020, by Raeker et al.
Kietzman et al., "Layered Manufacturing Material Issues for SDM of Polymers and Ceramics," International Solid Freeform Fabrication Symposium, Jan. 1997, 9 pp.
Hobson, "Electroplating Copper And Silver Onto 3D Prints," Hackaday, accessed from https://hackaday.com/2015/01/12/electroplating-copper-and-silver-onto-3d-prints/, Jan. 12, 2015, 2 pp.
"3D Printing and Electroplating for Experimentation," Form Labs, accessed from https://formlabs.com/blog/combining-3D-printing-and-electroplating-for-replicable-experimentation/, Aug. 2, 2017, 4 pp.
"Metal Plating For Your 3D Printed Parts—A Practical Guide," AMFG, accessed from https://amfg.ai/2017/07/06/metal-plating-3d-printed-parts/, Jul. 6, 2017, 3 pp.
Wolff, "Conductive Thermoplastics for 3D Printing," SME Media, accessed from https://advancedmanufacturing.org/3d-printed-thermoplastics/, Feb. 9, 2017, 9 pp.

"FDM Best Practice: Embedding Hardware," Stratasys, 2014 (Applicant points out, in accordance with MPEP 609.04 (a), that the year of publication, 2014, is sufficiently earlier than the effective U.S. filing date, so that the particular month of publication is not in issue.) 6 pp.
Ota et al., "Application of 3D Printing for Smart Objects with Embedded Electronic Sensors and Systems," Advanced Materials Technologies, Mar. 2, 2016, 22 pp.
Crease, "MMF #4: Embedding Nuts in 3D Printed Parts for Hidden Fastener Strength," markforged.com/blog, Jul. 27, 2016, 18 pp.
Allen et al., "An Experimental Demonstration of Effective Curved Layer Fused Filament Fabrication Utilising a Parallel Deposition Robot," Additive Manufacturing, vol. 8, Oct. 2015, pp. 78-87.
Shafer et al., "Cleated Print Surface for Fused Deposition Modeling," Solid Freeform Fabrication 2016: Proceedings of the 26th Annual International Solid Freeform Fabrication Symposium, Jan. 2017, pp. 1359-1365.
"Amazing Six-Axis 3D Printer Shown," /blog/2013/10/10/AMAZING-SIX-AXIS-3D-PRINTER-SHOWN-HTML, Fabbaloo, Oct. 10, 2013, 5 pp.
Walter, "3D Printering: Non-Planar Layer FDM," Hackaday, Jul. 27, 2016, 12 pp.
Yuen, "Embedding Objects During 3D Printing to Add to New Functionalities," Biomicrofluidics, vol. 10, Issue 4, Jul. 13, 2016, 10 pp.
Extended Search Report from counterpart European Application No. 20204970.6, dated Mar. 1, 2021, 11 pp.
Response to Extended Search Report dated Mar. 1, 2021, from counterpart European Application No. 20204970.6, filed Nov. 16, 2021, 10 pp.

\* cited by examiner form an additively manufactured component. After additively forming one or more layers of the component, or after forming the entire component, the binder may be selectively

FUSED FILAMENT FABRICATION OF ABRADABLE COATINGS

This application claims the benefit of U.S. Provisional Application Ser. No. 62/935,377, entitled "FUSED FILAMENT FABRICATION OF ABRADABLE COATINGS" and filed on Nov. 14, 2019, the entire content of which is incorporated herein by reference.

TECHNICAL FIELD

The disclosure relates to additive manufacturing techniques, in particular, to additive manufacturing of alloy components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

The disclosure describes example techniques, systems, materials, and compositions for additively manufacturing abradable coatings using fused filament fabrication.

In some examples, the disclosure describes a technique that includes a method comprising: depositing, by a filament delivery device, a filament on a substrate defining a major surface to form an unsintered layer, the filament including a powder and a binder, the powder including a metal or alloy; and removing substantially all of the binder; and sintering the unsintered layer to form an abradable layer for the substrate defining the major surface.

In some examples, various aspects of the techniques described in this disclosure are directed to an additive manufacturing system comprising: a substrate defining a major surface; a filament delivery device; and a computing device configured to: control the filament delivery device to deposit a filament on the substrate, the filament including a powder and a binder, wherein the binder is configured to be substantially removed from the filament and the powder includes a metal or alloy configured to be sintered to form an abradable layer.

In some examples, various aspects of the techniques described in this disclosure are directed to an additively manufactured component comprising: a substrate defining a major surface; and an abradable layer formed on the substrate using fused filament fabrication in which a filament is deposited on the substrate to form an unsintered layer and the unsintered layer undergoes sintering to form the abradable layer, the filament comprising a powder including a metal or alloy and a binder.

The details of one or more examples are set forth in the accompanying drawings and the description below. Other features, objects, and advantages will be apparent from the description and drawings, and from the claims.

DETAILED DESCRIPTION

Figure 1:
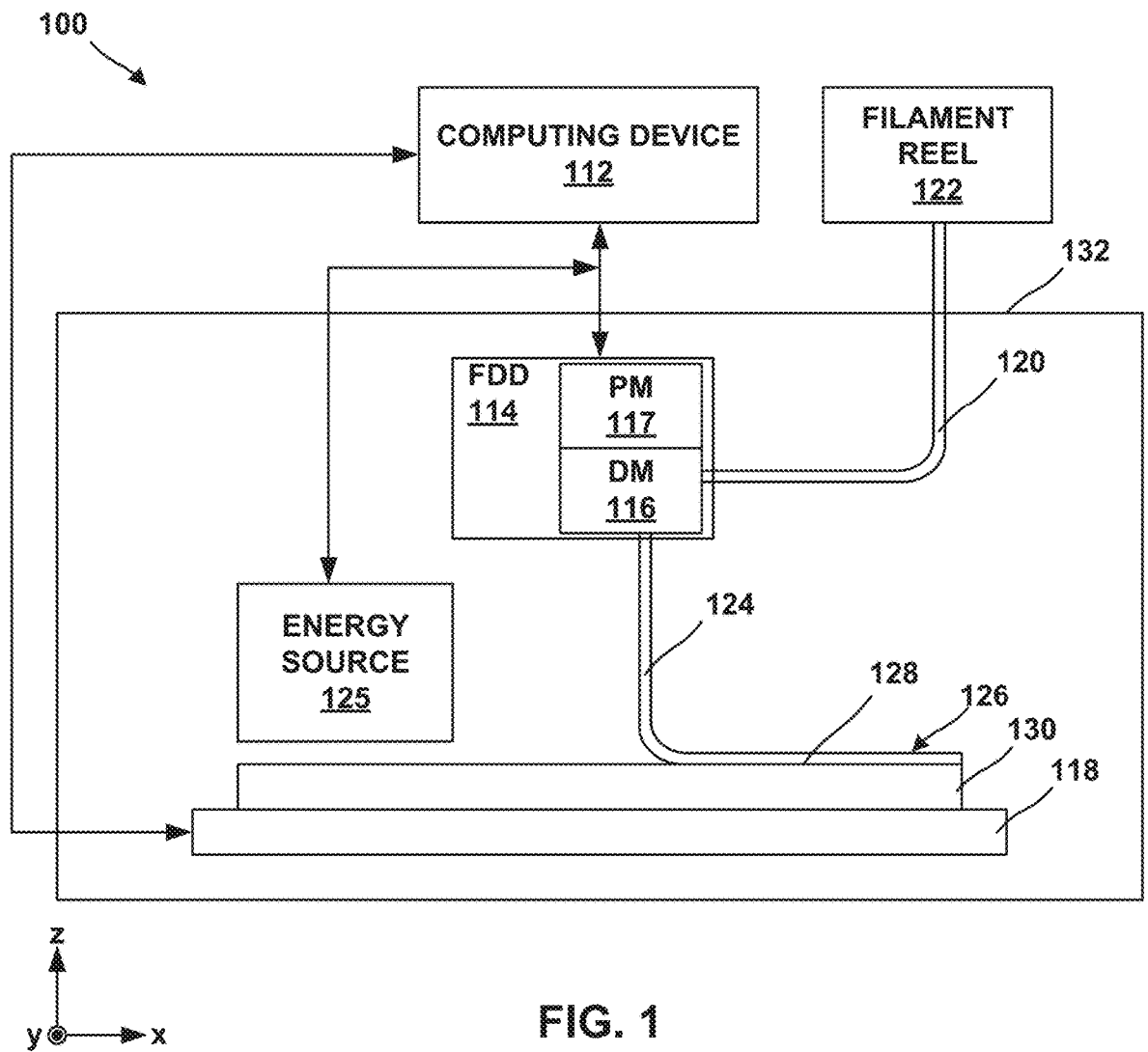
FIG. 1 is a conceptual block diagram illustrating an example system for forming an additively manufactured component by fused filament fabrication of a material including a metal or alloy powder and a binder.

The disclosure generally describes techniques for forming additively manufactured components using fused filament fabrication. Additive manufacturing of metal or alloy components may present unique challenges, for example, compared to additive manufacturing of polymeric components. For example, while techniques such as powder bed fusion (including direct metal laser sintering, electron beam melting, selective laser sintering, or the like) which use a directed energy beam to fuse and sinter material may be useful in additive manufacturing, some alloys may respond to energy beams in a manner that may not be conducive to localized melting or localized sintering. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients.

In some examples, a material including a sacrificial binder and a powder including, as examples, one or more of an MCrAlY alloy (such as a Nickel Chromium Aluminum Yttrium (NiCrAlY) alloy or a Cobalt Nickel Chromium Aluminum Yttrium (CoNiCrAlY) alloy) and/or a refractory metal (such as tungsten, titanium, molybdenum, tantalum, and/or niobium) or refractory metal alloy, dispersed in the binder may be deposited using fused filament fabrication to form an additively manufactured component. After additively forming one or more layers of the component, or after forming the entire component, the binder may be selectively removed or sacrificed from the layers or the component, for example, using heating, chemical dissolution, or the like.

Sacrificing the binder from the layers or the component may leave substantially only the powder in the layers or the component. The component may be further treated, for example, by sintering, to strengthen or densify the powder and form the additively manufactured component. By using the material including the sacrificial binder and the powder, removing the sacrificial binder, and sintering the powder, high-melt temperature alloys may be used, residual (free) powder may be reduced, and crack propensity may be reduced due to the absence of melting. Further, microstructure of the additively manufactured component may be more carefully controlled by controlling microstructure of the powder and avoiding melting of the powder during processing.

Abradable layers may benefit from a fused filament fabrication as abradable layers may have to address two opposing problems. In one instance, portions of an abradable layer may provide abradability (referring to an ability to be intentionally worn away by contact with another component) while other portions of the abradable layer may have to resist erosion (referring being worn away by debris, water, or other particulate, including wind).

To accommodate the dual, but opposing, problems, abradable layers deposited using thermal spraying may attempt to control deposition using templates that change various properties of portions of the abradable layer, such as macro and micro porosity, density, shape, etc. However, as thermal spraying involves application of heat, some constituents of the coating may be removed prematurely during the spraying process, effecting the properties of the resulting portions of the abradable layers in pseudo-random ways that may impact abradability and erosion resistance.

Abradable layers that are applied using brazing may produce more consistent results. That is, an abradable layer may be cast or otherwise formed, and then brazed to an underlying permanent substrate, where a first portion of the abradable layer may be more conducive to abrasion and a second portion may be more erosion resistant (compared to the first portion). However, brazed abradable layers are often limited in structure (e.g., are only available in a honeycomb geometric pattern). Further, some materials may be difficult or expensive to braze.

Using fused filament fabrication, properties of various portions of the abradable layer may be carefully tailored to an intended purpose (e.g., abradability or erosion resistance). In other words, a filament including a binder and a powder including a metal or alloy may be applied to form a first portion of the abradable layer that is conducive to abradability (having a lower density, higher porosity, a selected composition, etc. compared to a second portion of the coating). The same filament or a different filament may be applied to form the second portion of the abradable layer that is exhibits better erosion resistance (having a higher density, lower porosity, different composition, etc. compared to the first portion).

Carefully controlling application of the filament in a fused filament fabrication process may permit precise manufacturing of a component that may improve operation of the underlying component itself. For example, in the context of turbine engines, a filament delivery device may deposit the filament in various geometries (e.g., honeycomb, continuous geometries—meaning no gaps, non-continuous geometries—meaning possible gaps) with various uniformities in terms of metal or alloy or properties to address the dual, but opposite, problem described above.

Through this application of an abradable coating, increased power efficiency of a gas turbine engine may be achieved by reducing gaps between a blade tip and a surrounding blade track or shroud, given that the tip of the fan blade may abrade the first portion of the abradable layer to form a more efficient seal, while the second portion of the abradable layer may resist erosion and thereby reduce air from flowing around the tip of a fan blade. In addition, fused filament fabrication may enable geometries that increase air pressure at the tip of the fan blade, thereby potentially reducing the ability of air to flow around the tip of the fan blade, further increasing, in some instances, power efficiency of the engine.

FIG. 1 is a conceptual block diagram illustrating an example fused filament fabrication system 100 for performing fused filament fabrication to form an additively manufactured component including a powder and a binder by filament delivery. Additive manufacturing system 100 may include computing device 112, filament delivery device 114, enclosure 132, and stage 118.

Computing device 112 may include, for example, a desktop computer, a laptop computer, a workstation, a server, a mainframe, a cloud computing system, or the like. Computing device 112 is configured to control operation of additive manufacturing system 100, including, for example, filament delivery device 114, stage 118, or both. Computing device 112 may be communicatively coupled to filament delivery device 114, stage 118, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

In some examples, computing device 112 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 114 may include, for example, a delivery mechanism (DM) 116 for delivering a filament 120 to or near stage 118, and an optional positioning mechanism (PM) 118. Filament delivery device 114 may advance filament 120 from a filament reel 122 and heat filament 120 to above a softening or melting point of a component of filament 120 (e.g., a polymeric binder) to form a softened filament 124. Softened filament 124 is then extruded from delivery mechanism 116 and laid down in a road 126 (which may also be referred to as a path 126) on a major surface 128 of a substrate 130 (or, in subsequent layers, on a previously deposited road). The softened filament 134 cools and, in this way, is joined to other roads.

Substrate 130 may include a build plate on stage 118, or any suitable substrate defining a build surface. For example, substrate 130 may include a metal or glass plate defining a substantially planar surface. In other examples, substrate 130 may include surface features or a shaped (e.g., curved or curvilinear) surface on which the additively manufactured component is manufactured. In some examples, system 110 may not include a separate substrate 130, and filament delivery device 114 may deposit softened filament 124 on a build surface defined by stage 118, or on another component, or on layers of prior softened filament 124 or another material.

In some examples, filament delivery device 114 may, instead of receiving filament 120 from filament reel 122, include a chamber that holds a volume of a composition. The composition may be flowable, extrudable, or drawable from filament delivery device 114, for example, from delivery mechanism 116, in the form of softened filament 124 that may be deposited on or adjacent stage 118 or substrate 130. Softened filament 124 of the composition may be dried, cured, or otherwise solidified to ultimately form an additively manufactured component. In some examples, system 100 may include an energy source 125 configured to deliver energy to softened filament 124 to cure softened filament 124, for example, by photocuring or thermally curing the composition of softened filament 124.

Computing device 112 may be configured to control relative movement of filament delivery device 114 and/or stage 118 to control where filament delivery device 114 delivers softened filament 124. For example, stage 118 may be movable relative to filament delivery device 114, filament delivery device 114 may be movable relative to stage 118, or both. In some implementations, stage 118 may be translatable and/or rotatable along at least one axis to position substrate 130 relative to filament delivery device 114. For instance, stage 118 may be translatable along the z-axis shown in FIG. 1 relative to filament delivery device 114. Stage 118 may be configured to selectively position and restrain substrate 130 in place relative to stage 118 during manufacturing of the additively manufactured component.

Similarly, filament delivery device 114 may be translatable and/or rotatable along at least one axis to position filament delivery device 114 relative to stage 118. For example, filament delivery device 114 may be translatable in the x-y plane shown in FIG. 1, and/or may be rotatable in one or more rotational directions. Filament delivery device 114 may be translated using any suitable type of positioning mechanism 117, including, for example, linear motors, stepper motors, or the like.

Computing device 112 may be configured control movement and positioning of filament delivery device 114 relative to stage 118, and vice versa, to control the locations at which roads 126 are formed. Computing device 112 may be configured to control movement of filament delivery device 114, stage 118, or both, based on a computer aided manufacturing or computer aided design (CAM/CAD) file. For example, computing device 112 may be configured to control filament delivery device 114 (e.g., positioning mechanism 117) to trace a pattern or shape to form a layer including a plurality of roads on surface 138. Computing device 112 may be configured to control filament delivery device 114 or stage 118 to move substrate 130 away from filament delivery device 114, then control filament delivery device 114 to trace a second pattern or shape to form a second layer including a plurality of roads 126 on the first layer. Computing device 112 may be configured to control stage 118 and filament delivery device 114 in this manner to result in a plurality of layers, each layer including a traced shape or design. Together, the plurality of layers defines an additively manufactured component.

System 100 also includes enclosure 132 that at least partially encloses filament delivery device 114 and stage 118, and optionally, energy source 125. In some examples, enclosure 132 substantially fully encloses delivery device 114 and stage 118, such that the environment within enclosure 132 may be controlled. In some examples, enclosure 132 includes or is coupled to a heat source configured to heat the interior environment of enclosure 132, a gas source and/or pump configured to control an atmospheric composition of the interior environment of enclosure 132, or the like. In this way, enclosure 132 may protect filament 120 and softened filament 124 during formation of the additively manufactured component, e.g., from unwanted chemical reactions that may change properties of the metal or alloy powder.

Filament reel 122 holds filament 120 having a selected composition. In some examples, system 100 includes a single filament reel 122 holding a single filament 120 having a single composition. In other examples, system 100 may include multiple filament reels 122, each filament reel holding a filament 120 having a selected composition. Regardless of the number of filaments 120 and filament reels 122, each filament may include a powder including a metal or alloy and a binder configured to bind the powder in filament 120.

The powder may include any suitable metal or alloy for forming an abradable coating. In some examples, the metal or alloy powder include a high-performance metal or alloy for forming component used in mechanical systems, such as a steel (e.g., stainless steel), a nickel-based alloy, a cobalt-based alloy, or the like. In some examples, the metal or alloy may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy may include a polycrystalline nickel-based superalloy or a polycrystalline cobalt-based superalloy, such as an MCrAlY alloy including NiCrAlY, CoCrAlY, or CoNiCrAlY.

For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, WI In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International.

In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, MI In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti.

In some examples, the metal or alloy may include a nickel based alloy available under the trade designation IN-738 or Inconel 738, or a version of that alloy, IN-738 LC, available from All Metals & Forge Group, Fairfield, NJ, or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. %

Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wi.

In some example, metal or alloy may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof.

Powders including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

Filament 120 also includes a sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The metal or alloy powder may be dispersed in the sacrificial binder, for example substantially uniformly dispersed in the sacrificial binder.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filaments 124 are extruded and/or after softened filaments 124 are laid down in roads 126 to form a material including the metal or alloy powder dispersed in the sacrificial binder, for example substantially uniformly dispersed in the sacrificial binder.

The curable polymer precursor may include a precursor, for example, one or more monomers, oligomers, or non-crosslinked polymers suitable for forming the polymeric material of the sacrificial binder upon curing. Thus, in some examples, energy source 125 may direct energy at a curable polymer precursor, for example, in the material, to selectively cure the curable polymer precursor to form roads 126 including the material that includes the metal or alloy powder and the sacrificial binder. In other examples, the heat to which the composition is exposed to form softened filaments 124 may initiate the curing reaction, and no additional energy source is used.

Filament 120 includes a selected amount of sacrificial binder and metal or alloy powder so that the material in roads 126 may include more than about 80% by volume of the metal or alloy powder, which may result in a substantially rigid component with reduced porosity being formed in response to removal of the sacrificial binder. In some examples, filament 120 includes sacrificial binder in an amount configured to cause the material to shrink by less than about 20 volume percent relative to an initial volume of the material in response to removing the sacrificial binder. For example, filament 120 may include less than about 20% by volume of the sacrificial binder.

In some examples, filament 120 includes at least one shrink-resistant agent. For example, the at least one shrink-resistant agent may include a ceramic, instead of, or in addition to, the oxide in any ODS present in the material(s).

Using fused filament fabrication, different properties of various portions of the abradable layer may be carefully tailored to an intended purpose (e.g., abradability or erosion resistance). In other words, a filament including a powder including a metal or alloy may be applied to form the first portion of the abradable layer as road 126 such that road 126 defines a pattern or structure that is conducive to abradability (having a lower density, higher porosity, a selected composition, etc. compared to the second portion). The same filament 120 or a different filament 120 may be applied to form the second portion of the abradable layer in the form of roads 126 that define a pattern or structure that is conducive to erosion resistance (having a higher density, lower porosity, a different composition, etc. compared to the first portion).

In operation, FDD 114 may deposit a filament 120 as softened filament 124 on a substrate 130 defining a major surface to form an unsintered layer in the form of one or more roads 126 (which may be stacked or adjacent to one another according to some pattern as described in more detail below). System 100 (e.g., energy source 125) or another device, such as a furnace, may be configured to remove substantially all of the binder and sinter the unsintered layer (e.g., formed by one or more of roads 126) to form an abradable layer for substrate 130 defining the major surface.

In the context of turbine engines, substrate 130 may represent a shroud, blade track, knife seal runner, or other major surface of the turbine engine. In other examples, substrate 130 may be a surface that is adjacent a rotating component of another mechanical system, such as a pump stator (e.g., a scroll pump stator) or the like. FDD 114 may deposit a number of roads in the different patterns referenced below to improve air flow through the turbine engine and thereby improve efficiency (in terms of energy expended to create a given amount of power or thrust). That is, FDD 114 may deposit softened filament 124 according to certain patterns that improve air flow through the turbine engine such that lower amounts of fuel (or other sources of energy, which may be provided by an electric generator) are required to produce the same changes in air pressure (and ultimately, thrust).

FDD 114 may deposit softened filament 124 as a uniform or non-uniform unsintered layer. Uniformity may refer to differences in composition of the filament 120. The composition of the filament 120 may differ in the composition of the powder, the binder (and possibly sacrificial binder), or both. A uniform unsintered layer may refer to roads 126 having a similar, if not substantially the same, composition in term of the powder and binder deposited by FDD 114 as filament 120 (or softened filament 124). The uniform unsintered layer may have, after sintering, common properties (within expected norms) throughout the resulting sintered layer.

A non-uniform unsintered layer may refer to an unsintered layer having different portions that present different properties. The non-uniformities may be with respect to composition of the filament 120. The composition of the filament 120 may differ in the composition of the powder, the binder, or both. A first and second portion of the unsintered layer may, in the context of turbine engines, feature properties that potentially improve erosion resistance, where such properties refer to increased density, reduced porosity, specific geometries that increase air pressure and reduce air flow around a tip of a fan blade or other compressor blade that would otherwise reduce air compression.

In some examples, the first and second portions of the unsintered layer may surround a third portion of the unsintered layer such that, relative to air flow through the shroud, the first and second portions are upstream and downstream, respectively, of the third portion of the unsintered layer. The first and second portions may have a similar or substantially the same properties that potentially provide improved erosion resistance relative to the third portion, while the third portion may have properties that provide improved abradability relative to the first and second portion. The tip of the turbine blade may be positioned radially inward with respect to the third portion of the unsintered layer such that, after sintering the unsintered layer to form the abradable layer, the abradable layer is machined (by the tip which may have an abrasive coating to improve abrasion of the abradable layer) to present a reduced gap between the tip of the turbine blade and the third portion of the abradable layer (even as heat increases that may result in expansion of the turbine blade).

FDD 114 may deposit softened filament 124 as a continuous or non-continuous unsintered layer (again in the form of one or more roads 126). A continuous unsintered layer may refer to a layer having no macro-sized gaps (e.g., gaps due to a pattern of the abradable coating), relative to air flow through a shroud, from inlet to outlet (meaning, as an example, a consistent barrier between air entering the shroud and air pushed by the turbine blades—or in other words, fan blades—exiting the fan). A non-continuous unsintered layer may refer to a layer having one or more gaps, relative to air flow through a shroud, from inlet to outlet (meaning, as an example, an inconsistent barrier between air entering the shroud and air pushed by the turbine blades exiting the fan).

A non-continuous unsintered layer, after sintering, may form an abradable layer in which air compression between the tip of the rotating component (e.g., blade tip) and the surrounding component (e.g., shroud or blade track) is potentially increased as a result of the pattern in which various protrusions are formed using softened filament 124. That is, FDD 114 may deposit softened filament 124 according to patterns that result in protrusions that potentially improve compression of air between the tip of the rotating component and the surrounding component, which may, in turn, reduce airflow between the tip and the surrounding component. This may potentially improve energy efficiency (in terms of gas or electricity expended to achieve a given power or thrust). A non-continuous unsintered layer formed in a non-continuous manner may result in certain pressures that divert air (and other particulates) away from substrate 130 (which may form part of a shroud or other substrate) and thereby potentially improve compression efficiency.

As such, being able to carefully control application of filament 120 in an additive manufacturing process may permit precise manufacturing of a component (e.g., an abradable layer on substrate 130—such as a shroud, blade track, knife seal substrate, etc.) that may improve operation of the underlying component itself. For example, in the context of turbine engines, FDD 114 may deposit the filament 120 as softened filament 124 in various geometries (e.g., honeycomb, continuous geometries—meaning no gaps, non-continuous geometries—meaning possible gaps) with various uniformities in terms of metal or alloy or properties to address the dual, but opposite, problem described above.

Through this application, power efficiency may be achieved by reducing the ability of air to flow around the tip given that the tip of the fan blade may abrade a portion of the abradable coating while other portions of the abradable coating may resist erosion. For example, a third portion of the abradable layer may be fabricated to form a more efficient seal, while the first and/or second portion of the abradable layer may be fabricated resist erosion and thereby reduce air from flowing around the tip of a fan blade. In addition, computing device 112 may be configured to select geometries that increase air pressure at the tip of the fan blade, thereby potentially reducing the ability of air to flow around the tip of the fan blade, further increasing, in some instances, power efficiency.

Figure 2:
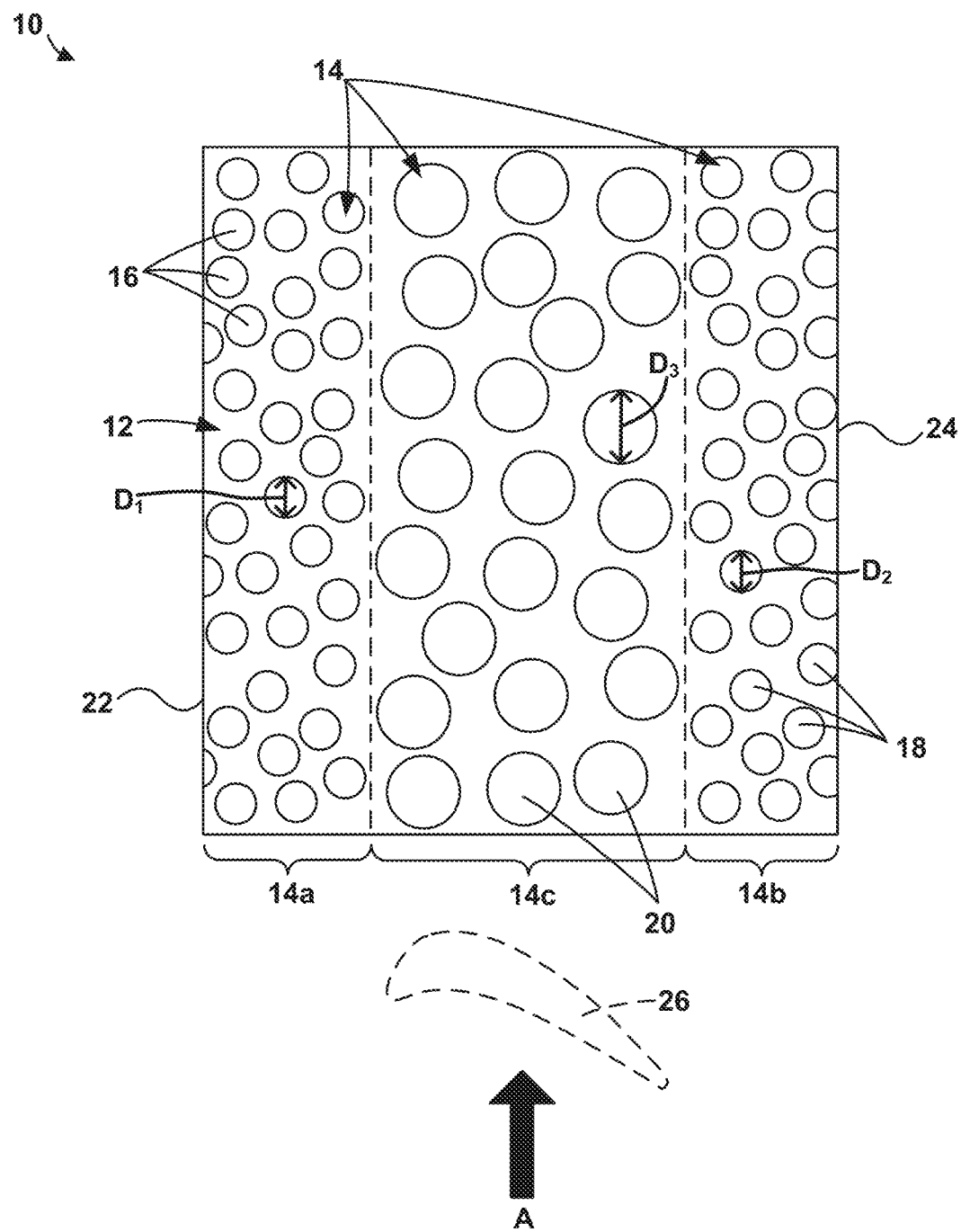
FIG. 2 is a conceptual diagram illustrating a top view of an example component including a non-continuous abradable coating manufactured using fused filament fabrication in accordance with various aspects of the techniques described in this disclosure.

FIG. 2 is a conceptual diagram illustrating a top view of an example component 10 including a non-continuous abradable coating 14 that includes a first plurality of coating blocks 16 and second plurality of coating blocks 18 that differ from a third plurality of coating blocks 20, for example, in average block size. Component 10 may include a mechanical component operating at relatively high conditions of temperature, pressure, or stress, for example, a component of a turbine, a compressor, or a pump. In some examples, component 10 includes a gas turbine engine component, for example, an aeronautical, marine, or land-based gas turbine engine. Component 10 may include, for example, a blade track or blade shroud (or segment of a blade track or blade shroud) that circumferentially surrounds a rotating component, for example, a rotating blade 26. Component 10 may, as another example, include a seal (e.g., knife or fin seal) in a compressor for preventing leakage of air around knives or fins.

In the example of FIG. 2, non-continuous abradable coating 14 is on or adjacent to a substrate 12. Substrate 12 may include a material suitable for use in a high-temperature environment. In some examples, substrate 12 includes a superalloy including, for example, an alloy based on Ni, Co, Ni/Fe, or the like. In examples in which substrate 12 includes a superalloy material, substrate 12 may also include one or more additives for improving the mechanical properties of substrate 12 including, for example, toughness, hardness, temperature stability, corrosion resistance, oxidation resistance, or the like. For example, the one or more additives may include titanium (Ti), cobalt (Co), or aluminum (Al).

Substrate 12 may define a leading edge 22 and a trailing edge 24. In some examples, leading edge 22 and trailing edge 24 may be substantially parallel to each other. In other examples, leading edge 22 and trailing edge 24 may not be substantially parallel to each other. In some cases, a first axis extending between leading edge 22 and trailing edge 24 may be in a substantially axial direction of a gas turbine engine including component 10 (e.g., parallel to the axis extending from the intake to the exhaust of the gas turbine engine). Thus, in some such cases, leading edge 22 and trailing edge 24 may be perpendicular or substantially perpendicular to the axial direction of the gas turbine engine including component 10.

Component 10 includes non-continuous abradable coating 14 on substrate 12. Non-continuous abradable coating 14 may extend from leading edge 32 to trailing edge 34 of substrate 12. In some examples, non-continuous abradable coating 14 may include a first portion 14a, a second portion 14b, and a blade rub portion 14c. Blade rub portion 14c may extend between first portion 14a and second portion 14b, and may be configured to be abraded, e.g., by blade 26 (or a tip of blade 26) of a gas turbine engine, in order to form a relatively tight seal between component 10 and blade 26. For example, blade 26 may be configured to rotate in the direction of arrow A shown in FIG. 2 and contact blade rub portion 14c.

In some examples, arrow A may be in a substantially circumferential direction of a gas turbine engine including component 10, such that blade 26 rotates in a substantially circumferential direction. Abradability of blade rub portion 14c may include a disposition to break into relatively small pieces, granules, or powder, when exposed to a sufficient physical force (e.g., by blade 26). Abradability may be influenced by the material characteristics of the material forming blade rub portion 14c of non-continuous abradable coating 14, such as fracture toughness and fracture mechanism (e.g., brittle fracture), one or more coating block parameters of blade rub portion 14c, and/or the porosity of the coating blocks of blade rub portion 14c.

As illustrated in the example of FIG. 2, each of first portion 14a, second portion 14b, and blade rub portion 14c of non-continuous abradable coating 14 includes a plurality of coating blocks 16, 18, or 20, respectively. For example, first portion 14a includes a first plurality of coating blocks 16, second portion 14b includes a second plurality of coating blocks 18, and blade rub portion 14c includes a third plurality of coating blocks 20. In some examples, each respective coating block of the first, second, and third plurality of coating blocks 16, 18, 20 may be spaced from a respective adjacent coating block of the first, second, and third coating block 16, 18, 20. In some such examples, a spacing between each respective coating block of the first, second, and third plurality of coating blocks 16, 18, 20 and a respective adjacent coating block of the first, second, and third plurality of coating blocks 16, 18, 20 may extend through an entire thickness of first portion 14a, second portion 14b, or blade rub portion 14c, respectively, of non-continuous abradable coating 14.

Figure 5:
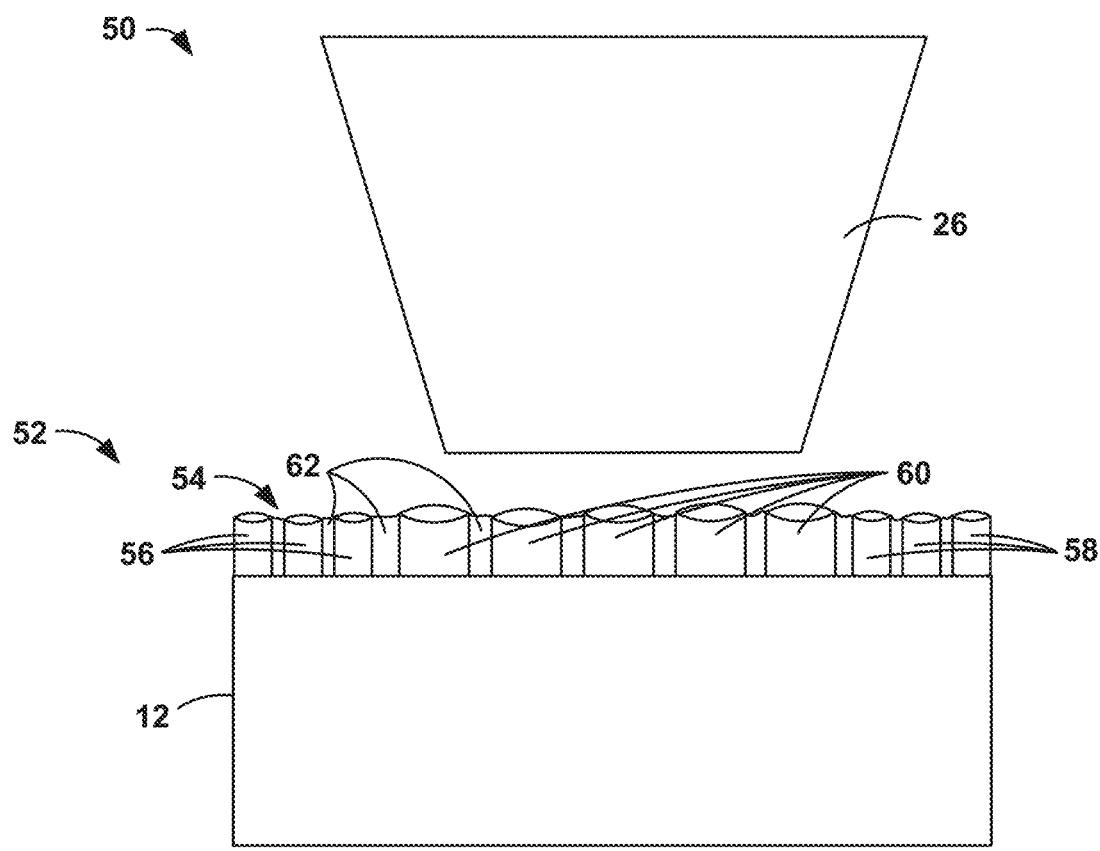
FIG. 5 is a conceptual diagram illustrating a side view of an example system including a blade and a component that includes a substrate and a non-continuous abradable coating on the substrate.

In other examples, the spacings may extend through a majority (e.g., more than 50%) of the thickness of the respective portion 14a to 14c of non-continuous abradable coating 14. For example, the spacings may extend through at least about 75% or at least about 90% of the thickness respective portion 14a-14c of non-continuous abradable coating 14. In any case, non-continuous abradable coating 14 including spacings between adjacent coating blocks of the first, second, and/or third pluralities of coating blocks 16, 18, 20 may reduce stress in non-continuous abradable coating 14. For example, such spacings may reduce tensile stress due to thermal expansion of substrate 12. Another example illustrating spacings between adjacent coating blocks is shown in the example of FIG. 5.

In the example of FIG. 1, the first, second, and third pluralities of coating blocks 16, 18, and 20 all include respective coating blocks that have circular contour shapes. In other examples, one or more of the first plurality of coating blocks 16, the second plurality of coating blocks 18, or the third plurality of coating blocks 20 may have a contour shape other than a circle. For instance, one or more of the first plurality of coating blocks 16, the second plurality of coating blocks 18, or the third plurality of coating blocks 20 may have a contour shape of a triangle, a square, a rectangle, a hexagon, a closed polygon, an ellipse, a closed curvilinear shape, or another regular or irregular shape.

Moreover, one or more of the first plurality of coating blocks 16, the second plurality of coating blocks 18, or the third plurality of coating blocks 20 may have a more than one contour shape. For example, one or more of the first, second, or third plurality of coating blocks 16, 18, 20 may include coating blocks with a circular contour shape and coating blocks with a rectangular contour shape.

In some cases, the contour shape of the respective plurality of coating blocks 16, 18, 20 may provide first, second, or blade rub portions 14a to 14c of non-continuous abradable coating 14 with certain properties. For example, a shape of the respective coating blocks of the third plurality of coating blocks 20 may contribute to the abradability of blade rub portion 14c. As one example, contour shapes that are rounded or do not include relatively sharp edges or corners may be more easily abraded or put less stress on blade 26 upon contact with the respective coating blocks in comparison to contour shapes with relatively sharp edges or corners. Thus, in some examples, such as the example of FIG. 4, the third plurality of coating blocks 20 of blade rub portion 14c may be different in contour shape than at least one of the first or second plurality of coating blocks 16, 18.

At least one of the first plurality of coating blocks 16 or the second plurality of coating blocks 18 may be different from the third plurality of coating blocks 20 in at least one coating block parameter. In turn, at least one of first portion 14a or second portion 14b may have different properties than those of blade rub portion 14c. For example, the third plurality of coating blocks 20 of blade rub portion 14c may be configured to be more easily abraded than the first or second plurality of coating blocks 16, 18, and the first and/or second plurality of coating blocks 16, 18 of first and second portions 14a, 14b, respectively, may be configured to provide increased protection to the portions of non-continuous abradable coating 14 not configured to be contacted by blade 26.

Thus, non-continuous abradable coating 14 including various portions 14a to 14c with pluralities of coating blocks 16, 18, and 20 that differ in at least one coating block parameter may enable non-continuous abradable coating 14 to be tailored to provide certain properties based on the portion of substrate 12 in which portions 14a to 14c of non-continuous abradable coating 14 are on. In other words, non-continuous abradable coating 14 that includes the third plurality of coating blocks 20 having at least one coating block parameter different from the first and/or second pluralities of coating blocks 16, 18 may improve blade rub, while also reducing stress, increasing erosion resistance, reducing leakage, or the like in comparison to some other coatings.

In some examples, the first plurality of coating blocks 16, the second plurality of coating blocks 18, or both, may be different than the third plurality of coating blocks 20 in at least one coating block parameter. In some such examples, the at least one coating block parameter may include an average coating block size, an average pitch between coating blocks, a coating block shape, or a coating block orientation. The average coating block size may be a population average of the largest diameters, or dimensions of major axis passing through geometric centers, of blocks of a respective portion. For example, in the case of circular blocks, the average coating block size may be determined in terms of population average of diameters of respective circular blocks.

In the example of FIG. 2, both the first plurality of coating blocks 16 and the second plurality of coating blocks 18 differ from the third plurality of coating blocks 20 in average coating block size. For example, the first plurality of coating blocks 16 may define a first average coating block size $D_1$ (e.g., a population average of coating block diameters in portion 14a in the case of the circular coating blocks of FIG. 1), the second plurality of coating blocks 18 may define a second average coating block size $D_2$, and the third plurality of coating blocks 20 may define a third average coating block size $D_3$. In some examples, first average coating block size $D_1$ and/or second average coating block size $D_2$ may be different than third average coating block size $D_3$.

In the example of FIG. 2, both first average coating block size $D_1$ and second average coating block size $D_2$ are less than third average coating block size $D_3$. In other examples, only one of first average coating block size $D_1$ or second average coating block size $D_2$ may be less than third average coating block size $D_3$, or one of first or second average coating block size $D_1$, $D_2$ may be greater than third average coating block size $D_3$. In some examples, the relatively large third average coating block size $D_3$ may result in blade rub portion 14c of non-continuous abradable coating 14 being less dense than first and/or second portions 14a, 14b, which may facilitate blade 26 abrading non-continuous abradable coating 14 in blade rub portion 14c.

In a similar manner, the relatively small first and second average coating block sizes $D_1$, $D_2$ may result in first and second portions 14a, 14b of non-continuous abradable coating 14 being denser than blade rub portion 14c. In turn, first portion 14a and/or second portion 14b may reduce leakage, provide increased protection to substrate 12, increase erosion resistance, or the like. In this way, non-continuous abradable coating 14 with at least one of the first or second pluralities of coating blocks 16, 18 different than the third plurality of coating blocks 20 may provide specific properties to first and second portions 14a, 14b (e.g., reduced leakage, increased protection, increased erosion resistance, or the like) of non-continuous abradable coating 14, as well as to blade rub portion 14c (e.g., improved abradability).

Non-continuous abradable coating 14 may include any suitable metal or alloy. For example, non-continuous abradable coating 14 may be formed from metals or alloys that exhibit a hardness that is relatively lower than a hardness of blade 26 or an abrasive coating on the tip of blade 26 such that a blade tip or abrasive coating of blade 26 can abrade blade rub portion 14c of non-continuous abradable coating 14 by contact. Thus, the hardness of non-continuous abradable coating 14, or at least blade rub portion 14c of non-continuous abradable coating 14, relative to the hardness of the blade tip or abrasive coating may be indicative of the abradability of blade rub portion 14c. The composition of non-continuous abradable coating 14 will be described generally with respect to non-continuous abradable coating 14 (e.g., including first, second, and blade rub portions 14a to 14c).

Thus, in some examples, first portion 14a, second portion 14b, and/or blade rub portion 14c may include the same or substantially the same composition. It should be understood that in other examples, however, at least one of first portion 14a, second portion 14b, or blade rub portion 14c may include a composition different than at least one other of first portion 14a, second portion 14b, or third portion 14c. For example, the abradability of non-continuous abradable coating 14 may depend on the respective composition (e.g., the physical and mechanical properties of the composition) of the coating, and therefore, in some cases, blade rub portion 14c may include a different composition than that of one or both of first portion 14a or second portion 14b.

In some examples, in addition to the coating block parameters and/or the composition of non-continuous abradable coating layer 14, the abradability of the non-continuous abradable coating 14 may also depend on a porosity of the coating blocks of the respective first, second, or third pluralities of coating blocks 16, 18, or 20. For example, a relatively porous composition of coating blocks 16, 18, 20 may exhibit a higher abradability compared to a relatively nonporous composition, and a composition with a relatively higher porosity may exhibit a higher abradability compared to a composition with a relatively lower porosity, everything else remaining the same. Moreover, relatively porous coating blocks of the plurality of coating blocks 16, 18, or 20 may have a decreased thermal conductivity in comparison to coating blocks with relatively lower porosities or dense microstructures.

Thus, in some examples, each coating block of the first, second, and/or third plurality of coating blocks 16, 18, 20 may include a plurality of pores. The plurality of pores may include at least one of interconnected voids, unconnected voids, partly connected voids, spheroidal voids, ellipsoidal voids, irregular voids, or voids having any predetermined geometry, or networks thereof. In some examples, each coating block of the first and second plurality of coating blocks 16, 18 may exhibit a lower porosity than each coating block of the third plurality of coating blocks 20. For example, each coating block of the first and second plurality of coating blocks 16, 18 may exhibit a porosity of less than about 10 vol. %, and each coating block of the third plurality of coating blocks 20 may exhibit a porosity between about 50 vol. % and about 80 vol. %, where porosity is measured as a percentage of pore volume divided by total volume of the respective coating block of the first, second, and/or third plurality of coating blocks 16, 18, 20. The porosity of the respective coating blocks may be measured using mercury porosimetry, optical microscopy, a method based on Archimedes' principle, e.g., a fluid saturation technique, or the like.

In some examples, at least one of the coating blocks of the first, second, and/or third plurality of coating blocks 16, 18, 20 may each have a porosity different than another of the coating blocks of the first, second, and/or third plurality of coating blocks 16, 18, 20. For instance, in some cases, each coating block of the third plurality of coating blocks 20 may have a higher porosity than one or both of the respective coating blocks of the first plurality of coating blocks 16 or the second plurality of coating blocks 18, which may enable blade rub portion 14c to be more easily abraded than first or second portion 14a, 14b. Moreover, the coating blocks of the first and/or second plurality of coating blocks 16, 18 with a relatively lower porosity than the coating blocks of the third plurality of coating blocks 20 may help prevent leakage, provide increased protection to substrate 12, increase erosion resistance, or combinations thereof.

In some examples, the porosity of the coating blocks may be created and/or controlled by fused filament fabrication system 100 described above with respect to the example of FIG. 1. Through the use of controlling application of the coating blocks as softened filament 124 and using different amounts of binder and/or sacrificial binder, FDD 114 may deposit different coating blocks that result in coating blocks 16-20 having different levels (or possible the same or nearly the same levels) of porosity. As such, system 100 may create metal foams or other macrostructures of varying degrees of macrostructure porosity while having varying degrees of microstructure porosity.

Additionally, or alternatively, FDD 114 may deposit softened filament 124 in a selected pattern within a coating block 16, 18, 20 to control porosity within the coating block 16, 18, 20. For example, by depositing softened filament 124 in parallel roads 124, adjacent filaments 124 may stack relatively closely together, leaving relatively little space between adjacent filaments and thus lower amounts of porosity. In contrast, by depositing softened filament 124 in non-parallel roads 124 (e.g., adjacent roads 124 are oriented at an angle with respect to each other or deposited in pseudo-random directions), larger gaps may be left between adjacent filaments, potentially leaving higher levels of porosity upon removing the binder and sintering the powder including the metal or alloy.

As described above, non-continuous abradable coating 14 may extend between leading edge 22 and trailing edge 24 of substrate 12. For example, first portion 14a may extend from leading edge 22 to a center portion of substrate 12, second portion 14b may extend from trailing edge 24 to the center portion of substrate 12, and blade rub portion 14c may extend between first portion 14a and second portion 14b. In some examples, blade rub portion 14c may be wider than a width of blade 26 or a tip of blade 26. For instance, blade rub portion 14c may define a width measured along an axial axis extending from leading edge 22 to trailing edge 24 of substrate 12 that is greater than a width of blade 26 or a tip of blade 26 (and any potential axial travel of blade 26) measured along the axial axis. In this way, blade 26 may be able to form a blade path in blade rub portion 14c without contacting and/or abrading an underlying coating layer or substrate 12. In other examples, the width of blade rub portion 14c may be less than or equal to the width of blade 26 or a tip of blade 26 (and any potential axial travel of blade 26).

In some examples, non-continuous abradable coating 14 (or at least blade rub portion 14c of non-continuous abradable coating 14) may be thick enough such that the blade tip of blade 26 can abrade non-continuous abradable coating 14 to form a blade path in blade rub portion 14c without contacting and/or abrading an underlying coating layer or substrate 12. In some such examples, non-continuous abradable coating 14 may have a thickness of between about 0.025 mm (about 0.01 inches) and about 3 mm (about 0.12 inches). In other examples, non-continuous abradable coating 14 may have other thicknesses.

In some examples, in addition to, or as an alternative to, the third plurality of coating blocks 20 of blade rub portion 14c being different from at least one of the first plurality of coating blocks 16 or the second plurality of coating blocks 18 in average coating block size, the third plurality of coating blocks 20 of blade rub portion 14c may be different from at least one of the first plurality of coating blocks 16 or the second plurality of coating blocks 18 in a different coating block parameter. For example, the third plurality of coating blocks 20 of blade rub portion 14c may be different from at least one of the first plurality of coating blocks 16 or the second plurality of coating blocks 18 in an average pitch between coating blocks.

Figure 3:
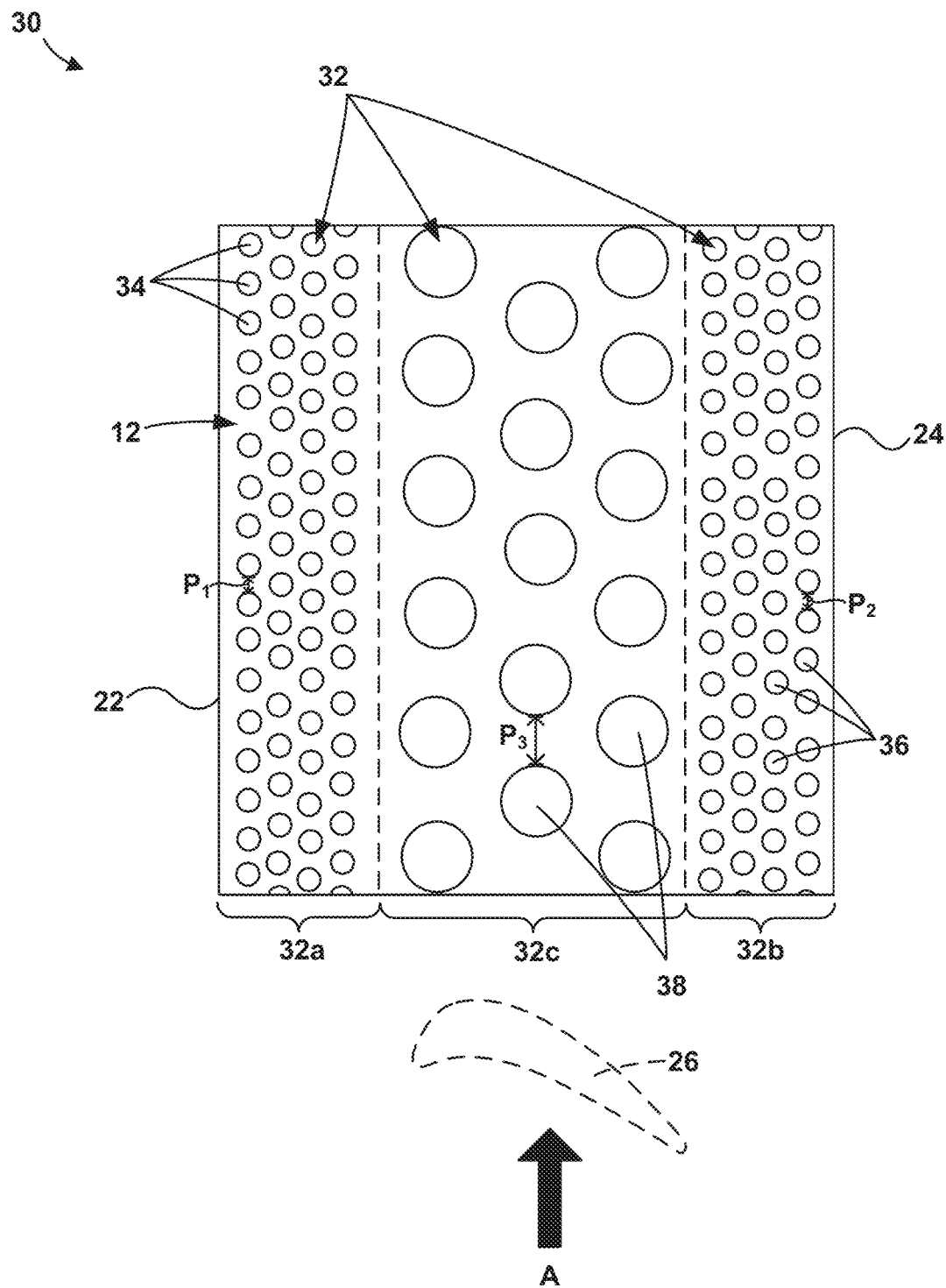
FIG. 3 is a conceptual diagram illustrating a top view of an example component including a non-continuous abradable coating that includes a first plurality of coating blocks and second plurality of coating blocks that differ from a third plurality of coating blocks in average inter-block pitch.

FIG. 3 is a conceptual diagram illustrating a top view of an example component 30 including a non-continuous abradable coating 32 that includes a first plurality of coating blocks 34 and second plurality of coating blocks 36 that differ from a third plurality of coating blocks 38, for example, in inter-block pitch. Non-continuous abradable coating 32 may be substantially similar to non-continuous abradable coating 14 of FIG. 2 in composition and one or more block parameters. For instance, non-continuous abradable coating 32 may be the same or substantially the same as non-continuous abradable coating 14, except for the respective coating block parameter in which the coating blocks of a first portion 32a and/or a second portion 32b of non-continuous abradable coating 32 differs from the coating blocks of a blade rub portion 32c.

For example, in the example of FIG. 2, the first and second pluralities of coating blocks 16, 18 of first and second portions 14a, 14b differ from the third plurality of coating blocks 20 of blade rub portion 14c in average coating block size. In the example of FIG. 3, a first plurality of coating blocks 34 of first portion 32a and a second plurality of coating blocks 36 of second portion 32b differ from a third plurality of coating blocks 38 of blade rub portion 32c in average pitch between coating blocks. In some examples, coating blocks 34 of first portion 32a or coating blocks 36 of second portion may additionally differ from coating blocks 38 of blade rub portion 32 in average block size.

In some examples, both the first plurality of coating blocks 34 and the second plurality of coating blocks 36 differ from the third plurality of coating blocks 38 in average pitch between coating blocks. The average pitch between coating blocks may be an average distance between adjacent coating blocks of the respective plurality of coating blocks 34, 36, 38 (e.g., an average size of the space between the respective adjacent coating blocks). For example, the first plurality of coating blocks 34 may define a first average pitch between coating blocks $P_1$, the second plurality of coating blocks 36 may define a second average pitch between coating blocks $P_2$, and the third plurality of coating blocks 38 may define a third average pitch between coating blocks $P_3$. Although the first, second, and third average pitches $P_1$, $P_2$, $P_3$ are illustrated in FIG. 3 as measured in the circumferential direction (e.g., in the direction of arrow A), in other examples, the average pitches between coating blocks $P_1$, $P_2$, $P_3$ may be measured in any suitable direction. Moreover, in some cases, the first, second, or the plurality of coating blocks 34, 36, 38 may define more than one pitch between coating blocks. For example, first, second, and third pluralities of coating blocks 34, 36, 38 may define first, second, and third pitches $P_1$, $P_2$, $P_3$, respectively, in the circumferential direction, and may define alternative pitches between coating blocks in the axial direction.

In some examples, first average pitch between coating blocks $P_1$ and/or second average pitch between coating blocks $P_2$ may be different than third average pitch between coating blocks $P_3$. For instance, at least one of first average pitch between coating blocks $P_1$ or second average pitch between coating blocks $P_2$ may be less than third average pitch between coating blocks $P_3$. In other examples, at least one of first or second average pitch between coating blocks $P_1$, $P_2$ may be greater than third average pitch between coating blocks $P_3$.

In some examples, at least one of first average pitch between coating blocks $P_1$ or second average pitch between coating blocks $P_2$ being less than third average pitch between coating blocks $P_3$ may enable the third plurality of coating blocks 38 to be more easily abraded in comparison to the first or second plurality of coating blocks 34, 36. For example, the relatively large third average pitch between coating blocks $P_3$ may result in blade rub portion 32c of non-continuous abradable coating 32 being less dense than first and/or second portions 32a, 32b, which may facilitate abrasion of non-continuous abradable coating 32 in blade rub portion 32c by blade 26.

In a similar manner, the relatively small first and/or second average coating pitches $P_1$, $P_2$ may result in first and/or second portions 32a, 32b of non-continuous abradable coating 32 being denser than blade rub portion 32c. In turn, first portion 32a and/or second portion 32b may reduce leakage, provide increased protection to substrate 12, increase erosion resistance, or the like. In turn, non-continuous abradable coating 32 with at least one of first or second plurality of coating blocks 34, 36 different than the third plurality of coating blocks 38 in average pitch between coating blocks may enable first and second portions 32a, 32b to have reduced leakage, increased protection, increased erosion resistance, or the like, while also enabling blade rub portion 32c to exhibit improved abradability.

In addition to, or as an alternative to, average coating block size or average pitch between coating blocks, at least one of first portion 32a or second portion 32b may differ from blade rub portion 32c in another coating block parameter. For example, the coating blocks of first and/or second portion 32a, 32b may differ from the coating blocks of blade rub portion 32c in at least one of a surface area, a perimeter length, a contour shape, or orientation of the coating blocks.

Figure 4:
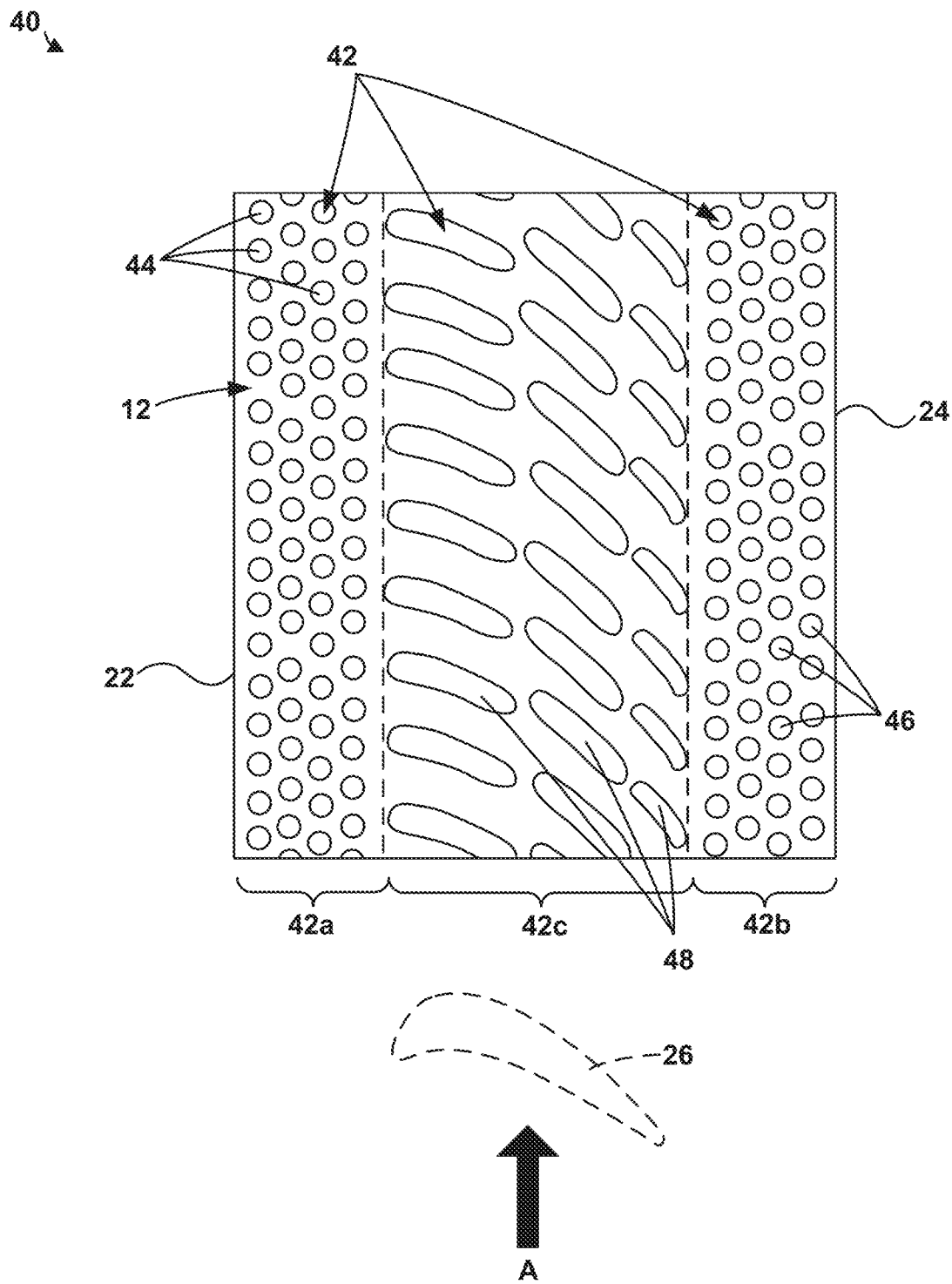
FIG. 4 is a conceptual diagram illustrating a side view of an example system including a blade and a component that includes a substrate and a non-continuous abradable coating on the substrate.

FIG. 4 is a conceptual diagram illustrating a top view of an example component 40 including a non-continuous abradable coating 42 that includes a first plurality of coating blocks 44 and a second plurality of coating blocks 46 that differ from a third plurality of coating blocks 48, for example, in block shape. Non-continuous abradable coating 42 may be substantially similar to non-continuous abradable coating 14 of FIG. 2 or non-continuous abradable coating 32 of FIG. 3 in composition and one or more block parameters.

For instance, non-continuous abradable coating 42 may be the same or substantially the same as non-continuous abradable coating 14 or 32, except for the respective coating block parameter in which the coating blocks of a first portion 42a and/or a second portion 42b of non-continuous abradable coating 42 differs from the coating blocks of a blade rub portion 42c. For example, in the example of FIG. 2, at least one of the first and second pluralities of coating blocks 16, 18 differ from the third plurality of coating blocks 20 of blade rub portion 14c in average coating block size, and in the example of FIG. 3, at least one of the first and second pluralities of coating blocks 34, 36 differ from the third plurality of coating blocks 38 of blade rub portion 14c in average pitch between coating blocks. In the example of FIG. 4, at least one of first plurality of coating blocks 44 of a first portion 42a or second plurality of coating blocks 46 of a second portion 42b differ from third plurality of coating blocks 48 of a blade rub portion 42c in at least one of a surface area, a perimeter length, a contour shape, or orientation of the respective coating blocks of the plurality of coating blocks 44, 46, 48.

For example, each coating block of first plurality of coating blocks 44 may define a first shape, each coating block of second plurality of coating blocks 46 may define a second shape, and each coating block of third plurality of coating blocks 48 may define a third shape, and each coating block defining each of the first shape, second shape, or third shape may define a surface area, a perimeter length, and a contour shape. In some examples, at least one of the first or second shape may be different than the third shape in at least one of the respective surface area, perimeter length, or contour shape. In some examples, the respective coating blocks of at least one of first plurality of coating blocks 44, second plurality of coating blocks 46, or third plurality of coating blocks 48 may define more than one shape.

For example, as illustrated in FIG. 4, the coating blocks of third plurality of coating blocks 48 defines three different shapes. Thus, in some such examples, at least one shape defined by the first or second plurality of coating blocks 44, 46 may be different from at least one shape defined by the third plurality of coating blocks 48 in surface area, perimeter length, and/or contour shape. As shown in FIG. 4, each of the three shapes defined by the third plurality of coating blocks 48 is different in surface area, perimeter length, and contour shape from the respective shapes of the first and second pluralities of coating blocks 44, 46. In other examples, only one or two of the three shapes defined by the third plurality of coating blocks 48 may be different in surface area, perimeter length, and/or contour shape from the respective shapes of the first and second pluralities of coating blocks 44, 46.

Moreover, in some examples, the first plurality of coating blocks 44 or the second plurality of coating blocks 46 may define more than one shape, and at least one of the respective shapes defined by the first or second plurality of coating blocks 44, 46 may be different than at least one shape defined by the third plurality of coating blocks 48. In other words, at least one of the surface area, perimeter length, or contour shape of at least one shape of the respective coating blocks of the first and/or second plurality of coating blocks 44, 46 may be different from at least one of the surface area, perimeter length, or contour shape of at least one shape of the respective coating blocks of the third plurality of coating blocks 48.

In some examples, the respective coating blocks of the first, second, or third plurality of coating blocks 44, 46, 48 may be aligned along a predetermined orientation. For example, in some cases, the coating blocks of the third plurality of coating blocks 48 may be oriented to substantially align with blade 26. In the example illustrated in FIG. 4, the third plurality of coating blocks 48 of blade rub portion 42c are oriented to substantially align with blade 26. Aligning the third plurality of coating blocks 48 of blade rub portion 42c may make blade rub portion 42c more easily abraded by blade 26. For example, aligning the plurality of coating blocks 48 with a leading edge of blade 26 may enable the blade 26 to more easily cut through the respective coating blocks.

In some examples, orienting the third plurality of coating blocks 48 of blade rub portion 42c to substantially align with blade 26 configured to contact blade rub portion 42c upon rotation of blade 26 in the circumferential direction (e.g., in the direction of arrow A) may help prevent blade 26 from abruptly or unevenly contacting coating blocks of the third plurality of coating blocks 48, which may reduce the bending load on blade 26 upon contact with the respective coating blocks, enable blade 26 to push or abrade the respective coating blocks 48 more efficiently, or the like. In contrast, a plurality of coating blocks that are not oriented to substantially align with blade 26, such as a plurality of coating blocks that are oriented substantially perpendicular to the leading edge of blade 26, may result in the blade rub portion being more difficult to abrade, increased stress on blade 26, less efficient abrasion of the blade rub portion, or the like in comparison to the third plurality of coating blocks 48 that are oriented to substantially align with blade 26 (e.g., are oriented relatively parallel to the leading edge of blade 26).

As described herein, at least one of the first plurality of coating blocks 44 or the second plurality of coating blocks 46 may be different than the third plurality of coating blocks 48 in at least one coating block parameter, such as, for example, average coating block size, average pitch between coating blocks, coating block shape, or coating block orientation. In this way, different portions 42a-42c of non-continuous abradable coating 42 can exhibit different properties. In some examples, it may be desirable for first and second portions 42a, 42b to have reduced leakage, increased protection, increased erosion resistance, or the like, and for blade rub portion 42c to have improved abradability. Therefore, the at least one coating parameter of first and/or second plurality of coating blocks 44, 46 different from the third plurality of coating blocks 48 may contribute to the different properties exhibited by the respective portions 42a-42c.

For example, coating block parameters configured to increase the tortuosity, increase an overall density, decrease a size of spacings between coating blocks, or the like of first and/or second portions 42a, 42b may contribute to reduced leakage, increased protection, and/or increased erosion resistance of first and/or second portions 42a, 42b. On the other hand, coating block parameters configured to decrease an overall density, increase an average coating block size, reduce stress on blade 26, increase a size of spacings between coating blocks, align with blade 26, improve the pushability of the respective coating blocks, or the like of first and/or second portions 42a, 42b may contribute to improved abradability of blade rub portion 42c. Thus, any combination of coating block parameters in accordance with the disclosure may be used to form non-continuous abradable coating 42.

FIG. 5 is a conceptual diagram illustrating a side view of an example system 50 including a blade 26 and a component 52 that includes a substrate 12 and a non-continuous abradable coating 54 on substrate 12. Non-continuous abradable coating 54 may be substantially similar to non-continuous abradable coating 14 of FIG. 2, non-continuous abradable coating 32 of FIG. 3, or non-continuous abradable coating 42 of FIG. 4. For example, a first plurality of coating blocks 56, a second plurality of coating blocks 58, and a third plurality of coating blocks 60 may be the same or substantially the same as the respective first, second, and third pluralities of coating blocks of non-continuous abradable coating 14, 32, or 42. Thus, for brevity, the details of non-continuous abradable coating 54 will not be repeated with respect to FIG. 5. In other examples, however, non-continuous abradable coating 54 may include a different non-continuous abradable coating in accordance with the disclosure (e.g., a non-continuous abradable coating other than non-continuous abradable coating 14, 32, or 42).

In some examples, non-continuous abradable coating 54 may be a first abradable coating, and component 52 may include a second abradable coating 62. For example, component 52 may include second abradable coating 62 on substrate 12. In some such examples, second abradable coating 62 may be between adjacent coating blocks of at least one of the first plurality of coating blocks 56, the second plurality of coating blocks 58, or the third plurality of coating blocks 60 of non-continuous abradable coating 54. In the example of FIG. 5, second abradable coating 62 is between adjacent coating blocks of all of the first plurality of coating blocks 56, the second plurality of coating blocks 58, and the third plurality of coating blocks 60 of non-continuous abradable coating 54. In other examples, one or more of the first plurality of coating blocks 56, the second plurality of coating blocks 58, or the third plurality of coating blocks 60 of non-continuous abradable coating 54 may not include second abradable coating 62 between the respective adjacent coating blocks. For instance, in some cases, a first portion of non-continuous abradable coating 54 including the first plurality of coating blocks 56 and a second portion including the second plurality of coating blocks 58 may include second abradable coating 62 between adjacent coating blocks, and a blade rub portion including the third plurality of coating blocks 60 may not include second abradable coating 62.

In any case, component 52 including second abradable coating 62 within at least some spacings between adjacent coating blocks of the first, second, and/or third plurality of coating blocks 56, 58, 60 may reduce leakage, improve erosion resistance, reduce stress of component 52, or combinations thereof. Additionally, or alternatively, component 52 may include second abradable coating 62 on non-continuous abradable coating 54 (e.g., on respective coating blocks of the first, second, and/or third plurality of coating blocks 56, 58, 60).

Second abradable coating 62 may include any suitable material. For example, second abradable coating 62 may include may material described above with respect to non-continuous abradable coating 14. Thus, in some cases, second abradable coating 62 may have the same or substantially the same composition as non-continuous abradable coating 54. In other examples, second abradable coating 62 may have a different composition than non-continuous abradable coating 54.

As described above with respect to non-continuous abradable coating 14, second abradable coating 62 may include a plurality of pores, such as, for example, at least one of interconnected voids, unconnected voids, partly connected voids, spheroidal voids, ellipsoidal voids, irregular voids, or voids having any predetermined geometry, or networks thereof. In some examples, such as examples in which second abradable coating 62 is between adjacent coating blocks of the first plurality of coating blocks 56, the second plurality of coating blocks 58, and/or the third plurality of coating blocks 60 and not on non-continuous abradable coating 54 (e.g., such that second abradable coating 62 is also substantially non-continuous), the porosity of second abradable coating 62 may be measured as a percentage of pore volume divided by total volume of the respective non-continuous block between the respective coating blocks of non-continuous abradable coating 54. In other examples, such as examples in which second abradable coating 62 is relatively continuous, the porosity of second abradable coating 62 may be measured as a percentage of pore volume divided by total volume of second abradable coating 62.

In some examples, second abradable coating 62 may have a relatively higher porosity (e.g., may be less dense) than the respective coating blocks of non-continuous abradable coating 54. Second abradable coating 62 having a relatively high porosity may result in component 52 having improved erosion resistance, improved protection, and/or reduced leakage, while maintaining improved thermal cycling resistance and decreased stress. For example, the relatively high porosity of second abradable coating 62 between adjacent coating blocks of non-continuous abradable coating 54 may be able to still accommodate thermal expansion of the respective coating blocks, which may reduce thermal stress in comparison to a continuous abradable coating or a second abradable coating with a relatively low porosity.

As described above, non-continuous abradable coatings 14, 32, 42, 54 may be applied to substrate 12 using fused filament fabrication, which may include depositing a filament (either metal or alloy powder along with a binder and/or sacrificial binder) on substrate 12 to form an unsintered layer. The unsintered layer may then be sintered to form non-continuous abradable layers or, in other words, coatings 14, 32, 42, 54. Spacings between adjacent coating blocks in the non-continuous abradable coating 14, 32, 42, 54 may reduce strain within the non-continuous abradable coating 14, 32, 42, 54 at an interface between the non-continuous abradable coating 14, 32, 42, 54 and an underlying layer (e.g., intermediate coating 66, bond coat 64, or substrate 12), thus increasing bond strength and reducing a likelihood of cracking, spallation, or both.

In some examples, the spacings between adjacent coating blocks of non-continuous abradable coating 14, 32, 42, 54 may be formed in non-continuous abradable coating 14, 32, 42, 54 by mechanical removal of portions of abradable coating material after deposition of the abradable coating material on substrate 12. However, in some examples, this may not efficiently reduce residual stress in non-continuous abradable coating 14, 32, 42, 54. Hence, in some examples, the spacings between adjacent coating blocks may be defined in non-continuous abradable coating 14, 32, 42, 54 as part of forming non-continuous abradable coating 14, 32, 42, 54 using fused filament fabrication.

Figure 6:
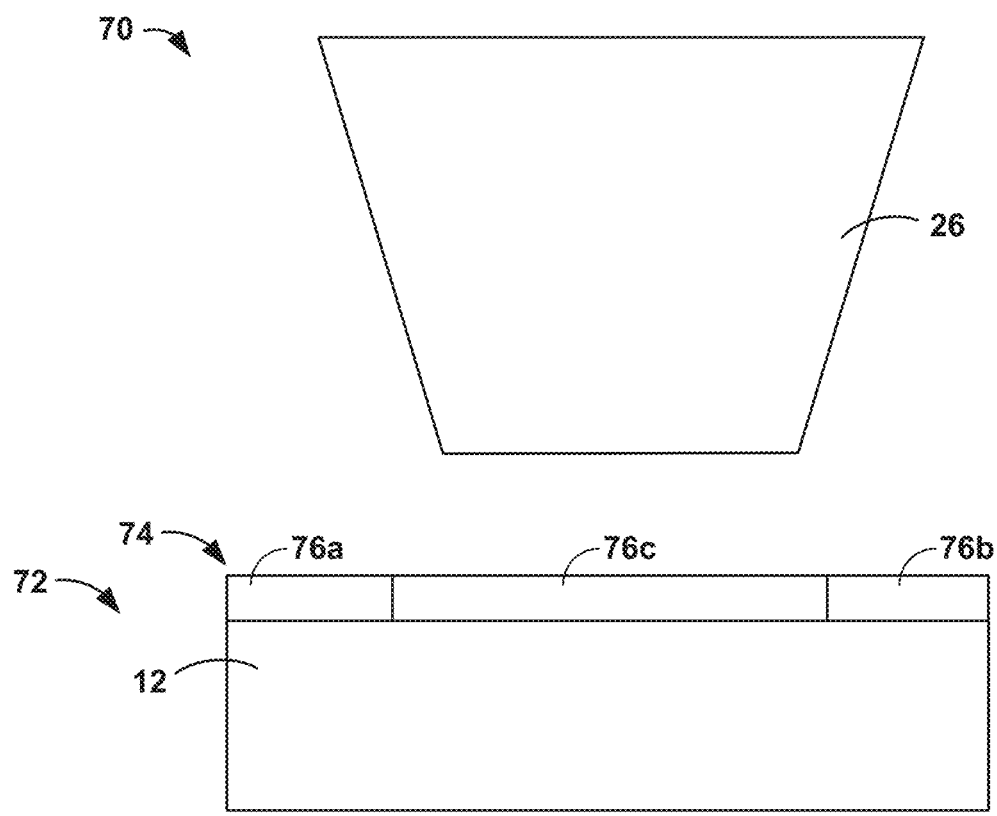
FIG. 6 is a conceptual diagram illustrating a sectional view of an example system including a blade and a component that includes a substrate and a continuous abradable coating on substrate.

FIG. 6 is a conceptual diagram illustrating a sectional view of an example system 70 including a blade 26 and a component 72 that includes a substrate 12 and a continuous abradable coating 74 on substrate 12. That is, continuous abradable coating 74 may not include any gaps or other protusions that are distinct and separate from other protrusions, but rather includes a continuous block of fused filaments.

As shown in the example of FIG. 6, continuous abradable coating 74 may include one or more portions (or blocks) 74a-74c, where portions 74a and 74b may feature erosion resistance while portion 74c may feature abradability so as to be easily abraded by blade 26. Although shown as including multiple portions 74a-74c, continuous abradable coating 74 may have fewer (including a single) or additional portions and the portions may be of the same or substantially similar composition (or, in other words, uniform) or of different compositions (or, in other words, non-uniform). As such, each of portions 74a-74c may be the same or substantially similar composition (which may reduce erosion resistance and/or abradability in certain contexts) or of different compositions, where portions 74a and 74b may be of the same or substantially similar composition, while portion 74c may be of a different composition compared to portions 74a and 74b.

Figure 7:
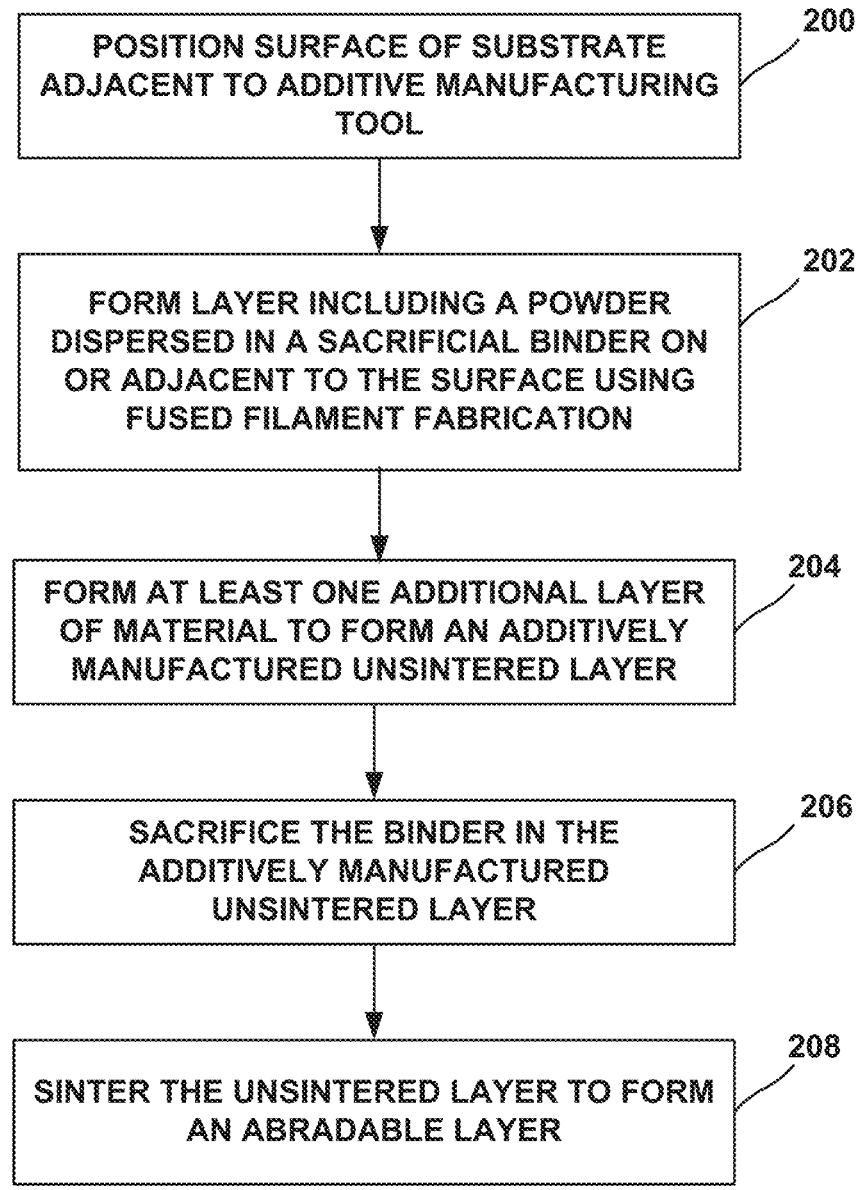
FIG. 7 is a flow diagram illustrating an example technique for forming an additively manufactured component using fused filament fabrication.

An example technique that may be implemented by system 100 will be described with concurrent reference to FIG. 7. FIG. 7 is a flow diagram illustrating an example technique for forming an abradable coating using fused filament fabrication. Although the technique of FIG. 7 is described with respect to system 100 of FIG. 1, in other examples, the technique of FIG. 7 may be performed by other systems, such a system including fewer or more components than those illustrated in FIG. 1. Similarly, system 100 may be used to performed other additive manufacturing techniques.

The technique of FIG. 7 includes positioning substrate 130 including surface 128 adjacent to a build position, e.g., on stage 118 (200). In some examples, system 100 may not include a separate substrate 130, the technique of FIG. 7 may include positioning a build surface defined by stage 118, or by another component, or layers of prior softened filament 124 or another material.

The technique of FIG. 7 also includes forming a road 126 of material using fused filament fabrication (202). Computing device 112 may cause filament delivery device 114 to deposit softened filament 124 in one or more roads 126 to ultimately form the additively manufactured unsintered layer. A plurality of roads 126 defining a common plane may define a layer of material. Thus, successive roads 126 may define a series of layers, for example, parallel layers, and the series of layers may eventually define the additively manufactured component.

The technique of FIG. 7 also includes forming, on roads 126 of material, at least one additional layer of material to form an additively manufactured unsintered layer (204). For example, computing device 112 may control movement and positioning of filament delivery device 114 relative to stage 118, and vice versa, to control the locations at which roads are formed. Computing device 112 may control movement of filament delivery device 114, stage 118, or both, based on a computer aided manufacturing or computer aided design (CAM/CAD) file. For example, computing device 112 may control filament delivery device 114 to trace a pattern or shape to form a layer including a plurality of roads 126 on surface 128, which collectively form an unsintered layer.

Computing device 112 may control filament delivery device 114 or stage 118 to move substrate 130 away from filament delivery device 114, then control filament delivery device 114 to trace a second pattern or shape to form a second layer including a plurality of roads on the previously deposited layer. Computing device 112 may control stage 118 and filament delivery device 114 in this manner to result in the plurality of layers, each layer including a traced shape or design (such as those illustrated in and described above with respect FIGS. 2-5). Together, the plurality of layers defines an additively manufactured unsintered layer (204).

The technique of FIG. 7 includes, after forming the additively manufacturing unsintered layer (204), sacrificing the binder from the unsintered layer (206). The sacrificing (206) may include delivering thermal energy, for example, by energy source 125, or a chemical (e.g., an etchant) to roads 124 in an amount sufficient to cause binder to be substantially oxidized, incinerated, carbonized, charred, decomposed, or removed from roads 124, while leaving the powder including the metal or alloy substantially intact. In other examples, the additively manufactured unsintered layer may be placed in a furnace to heat the additively manufactured component and cause removal of the binder from the unsintered layer (206).

The technique of FIG. 7 also includes, after sacrificing the binder (206), sintering the unsintered layer to form an abradable layer (208). The sintering may include a thermal treatment, for example, one or more predetermined cycles of exposure to predetermined temperatures for predetermined times. In some examples, energy source 125 may deliver energy to cause sintering. In other examples, the additively manufactured unsintered layer may be placed in a furnace to heat the additively manufactured component and cause sintering.

In some examples, the sintering (208) may promote the bonding of particles of powder to each other to strengthen the unsintered layer including substantially only the powder after the binder is sacrificed. Sintering may not melt the particles of powder, thus leaving the microstructure of the particles substantially intact. This may facilitate forming abradable layers with selected microstructures compared to processes that include melting the powder. The sintering (208) may also densify an interior or a surface region of the abradable layer, for example, by promoting powder compaction and reducing porosity. In some examples, the steps of removing the sacrificial binder (206) and sintering the component (208) may be combined in a single heating step or series of heating steps, e.g., within a furnace.

Figure 8A:
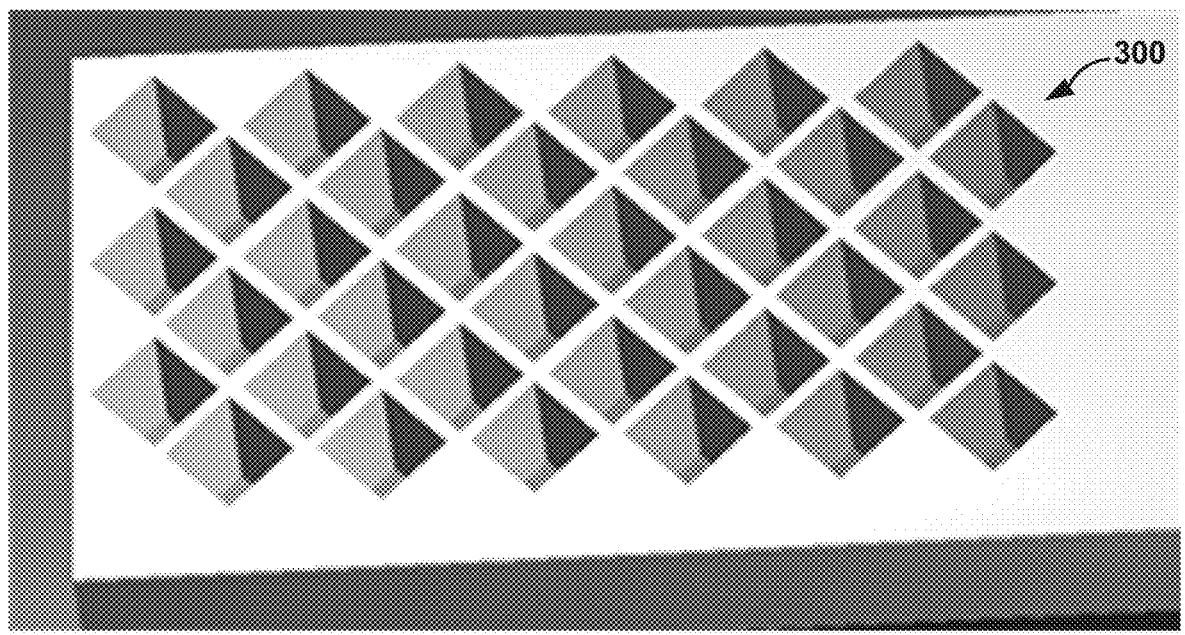
FIGS. 8A and 8B are diagrams illustrating different patterns for an abradable layer formed in accordance with the fused filament fabrication techniques described in this disclosure.
Figure 8B:
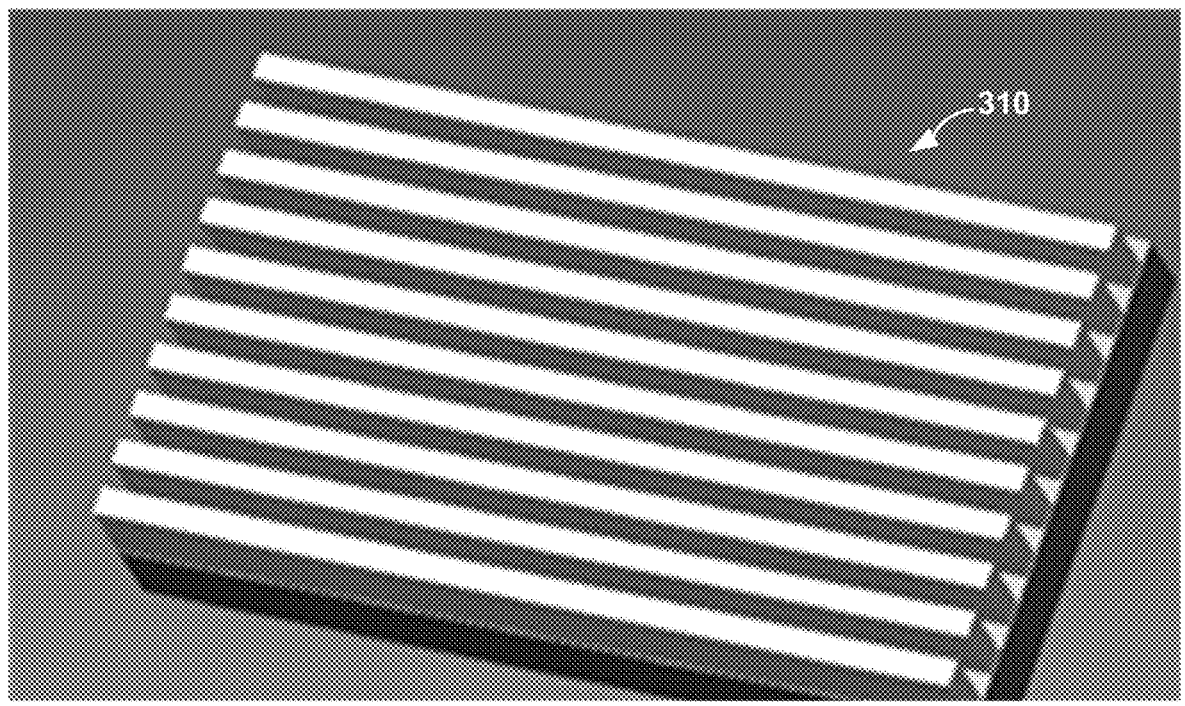

FIGS. 8A and 8B are diagrams illustrating different patterns for an abradable layer formed in accordance with the fused filament fabrication techniques described in this disclosure. As shown in the example of FIG. 8A, a lattice pattern 300 is shown while, in the example of FIG. 8B, a rowed pattern 310 is shown. In both of the examples of FIGS. 8A and 8B, each line or wall forming lattice pattern 300 and rowed pattern 310 may be thin enough to be easily cut (or, in other words, abraded) by a blade tip.

The wall may be from the depositing of a single pass of the printer head. In 3D printing, nozzle diameters may vary. One example of a nozzle diameter is approximately 0.4 millimeters (mm). For this 0.4 mm nozzle diameter, wall thickness may be between 0.3 mm and 0.5 mm. As such, there may be a range of wall thicknesses, but anything within the above noted 0.3-0.5 mm range may be conducive to being cut by a blade.

Although depicted as a square lattice pattern 300, the pattern may vary from that shown in the example of FIG. 8A. For example, rather than feature squares, lattice pattern 300 may include triangles, hexagons (or more generally any polygon), circles, ovals, and the like. In any event, each of patterns 300 and 310 may be suitable for knife seals, labyrinth seals, and the like.

In this respect, various aspects of the techniques may enable the following clauses:

Clause 1. A method comprising: depositing, by a filament delivery device, a filament on a substrate defining a major surface to form an unsintered layer, the filament including a powder and a binder, the powder including a metal or alloy; and removing substantially all of the binder; and sintering the unsintered layer to form an abradable layer for the substrate defining the major surface.

Clause 2. The method of clause 1, wherein the unsintered layer comprises a uniform unsintered layer.

Clause 3. The method of clause 1, wherein the unsintered layer comprises a non-uniform unsintered layer in which a first portion of the non-uniform unsintered layer has a different parameter than a second portion of the non-uniform unsintered layer.

Clause 4. The method of any combination of clauses 1-3, wherein the unsintered layer comprises a continuous unsintered layer in which the continuous unsintered layer is a single unsintered layer.

Clause 5. The method of any combination of clauses 1-3, wherein the unsintered layer comprises a non-continuous unsintered layer in which the non-continuous unsintered layer includes two or more separate portions.

Clause 6. The method of clause 5, wherein the two or more separate portions include separate filament blocks.

Clause 7. The method of any combination of clauses 1-3, wherein the unsintered layer includes a first portion defined by a first plurality of filament blocks, a second portion defined by a second plurality of filament blocks, and a third portion defined by a third plurality of filament blocks.

Clause 8. The method of clause 7, wherein each filament block of the first plurality of filament blocks defines a first shape, each filament block of the second plurality of filament blocks defines a second shape, and each filament block of the third plurality of filament blocks defines a third shape, and wherein the third shape is different from a least one of the first shape or the second shape in at least one of a surface area, a perimeter length, or a contour shape.

Clause 9. The method of any combination of clauses 7 and 8, wherein respective filament blocks of the third plurality of filament blocks are oriented to substantially align with a blade tip of a blade configured to contact the blade rub portion upon rotation of the blade in a circumferential direction.

Clause 10. An additive manufacturing system comprising: a substrate defining a major surface; a filament delivery device; and a computing device configured to: control the filament delivery device to deposit a filament on the substrate, the filament including a powder and a binder, wherein the binder is configured to be substantially removed from the filament and the powder includes a metal or alloy configured to be sintered to form an abradable layer.

Clause 11. The additive manufacturing system of clause 10, wherein the unsintered layer comprises a uniform unsintered layer.

Clause 12. The additive manufacturing system of clause 10, wherein the unsintered layer comprises a non-uniform unsintered layer in which a first portion of the non-uniform unsintered layer has a different parameter than a second portion of the non-uniform unsintered layer.

Clause 13. The additive manufacturing system of any combination of clauses 10-12, wherein the unsintered layer comprises a continuous unsintered layer in which the continuous unsintered layer is a single unsintered layer.

Clause 14. The additive manufacturing system of any combination of clauses 10-12, wherein the unsintered layer comprises a non-continuous unsintered layer in which the non-continuous unsintered layer includes two or more separate portions.

Clause 15. The additive manufacturing system of clause 14, wherein the two or more separate portions include separate filament blocks.

Clause 16. The additive manufacturing system of any combination of clauses 10-12, wherein the unsintered layer includes a first portion defined by a first plurality of filament blocks, a second portion defined by a second plurality of filament blocks, and a third portion defined by a third plurality of filament blocks.

Clause 17. The additive manufacturing system of clause 16, wherein each filament block of the first plurality of filament blocks defines a first shape, each filament block of the second plurality of filament blocks defines a second shape, and each filament block of the third plurality of filament blocks defines a third shape, and wherein the third shape is different from a least one of the first shape or the second shape in at least one of a surface area, a perimeter length, or a contour shape.

Clause 18. The additive manufacturing system of any combination of clauses 16 and 17, wherein respective filament blocks of the third plurality of filament blocks are oriented to substantially align with a blade tip of a blade configured to contact the blade rub portion upon rotation of the blade in a circumferential direction.

Clause 19. An additively manufactured component comprising: a substrate defining a major surface; and an abradable layer formed on the substrate using fused filament fabrication in which a filament is deposited on the substrate to form an unsintered layer and the unsintered layer undergoes sintering to form the abradable layer, the filament comprising a powder including a metal or alloy and a binder.

Clause 20. The additive manufacturing component of clause 19, wherein the unsintered layer comprises a uniform unsintered layer.

Clause 21. The additive manufacturing component of clause 19, wherein the unsintered layer comprises a non-uniform unsintered layer in which a first portion of the non-uniform unsintered layer has a different parameter than a second portion of the non-uniform unsintered layer.

Clause 22. The additive manufacturing component of any combination of clauses 19-21, wherein the unsintered layer comprises a continuous unsintered layer in which the continuous unsintered layer is a single unsintered layer.

Clause 23. The additive manufacturing component of any combination of clauses 19-21, wherein the unsintered layer comprises a non-continuous unsintered layer in which the non-continuous unsintered layer includes two or more separate portions.

Clause 24. The additive manufacturing component of clause 23, wherein the two or more separate portions include separate filament blocks.

Clause 25. The additive manufacturing component of any combination of clauses 19-21, wherein the unsintered layer includes a first portion defined by a first plurality of filament blocks, a second portion defined by a second plurality of filament blocks, and a third portion defined by a third plurality of filament blocks.

Clause 26. The additive manufacturing component of clause 25, wherein each filament block of the first plurality of filament blocks defines a first shape, each filament block of the second plurality of filament blocks defines a second shape, and each filament block of the third plurality of filament blocks defines a third shape, and wherein the third shape is different from a least one of the first shape or the second shape in at least one of a surface area, a perimeter length, or a contour shape.

Clause 27. The additive manufacturing component of any combination of clauses 25 and 26, wherein respective filament blocks of the third plurality of filament blocks are oriented to substantially align with a blade tip of a blade configured to contact the blade rub portion upon rotation of the blade in a circumferential direction.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
depositing, by a filament delivery device, a softened filament on a substrate defining a major surface to form an unsintered layer, the filament including a powder and a binder, the powder including a metal or an alloy, wherein the unsintered layer comprises a non-uniform unsintered layer in which a first portion is defined by a first plurality of filament blocks and a second portion is defined by a second plurality of filament blocks;
removing substantially all of the binder; and
sintering the unsintered layer to form an abradable layer for the substrate defining the major surface, wherein the first portion of the unsintered layer forms a first portion of the abradable layer and the second portion of the unsintered layer forms a second portion of the abradable layer, and wherein the first portion of the abradable layer defines a different porosity, density, composition, or microstructure than the second portion of the abradable layer.

2. The method of claim 1, wherein the unsintered layer comprises a continuous unsintered layer in which the continuous unsintered layer is a single unsintered layer.

3. The method of claim 1, wherein the unsintered layer further comprises a third portion defined by a third plurality of filament blocks.

4. The method of claim 3, wherein each filament block of the first plurality of filament blocks defines a first shape, each filament block of the second plurality of filament blocks defines a second shape, and each filament block of the third plurality of filament blocks defines a third shape, and wherein the third shape is different from at least one of the first shape or the second shape in at least one of a surface area, a perimeter length, or a contour shape.

5. The method of claim 3, wherein respective filament blocks of the third plurality of filament blocks are oriented to substantially align with a blade tip of a blade configured to contact a blade rub portion upon rotation of the blade in a circumferential direction.

6. The method of claim 3, wherein each filament block of the first plurality of filament blocks defines a first shape, each filament block of the second plurality of filament blocks defines a second shape, and each filament block of the third plurality of filament blocks defines a third shape, and wherein the third shape is circular.

7. The method of claim 3, wherein each filament block of the first plurality of filament blocks defines a first average coating block size, each filament block of the second plurality of filament blocks defines a second average coating block size, and each filament block of the third plurality of filament blocks defines a third average coating block size, and wherein the first average coating block size and the second average coating block size are less than the third average coating block size.

8. The method of claim 1, further comprising:
controlling, by a computing device, the filament delivery device to deposit the filament onto the major surface of the substrate.

9. The method of claim 1, wherein a composition of the first portion of the non-uniform unsintered layer and a composition of the second portion of the non-uniform unsintered layer are different.

10. The method of claim 1, wherein the first portion includes one or more gaps, relative to air flow through a shroud, from inlet to outlet.

11. A method comprising:
depositing, by a filament delivery device, a softened filament on a substrate defining a major surface to form an unsintered layer, the filament including a powder and a binder, the powder including a metal or an alloy, wherein the unsintered layer comprises a non-uniform unsintered layer in which a first portion is defined by a first plurality of filament blocks, a second portion of the non-uniform unsintered layer is defined by a second plurality of filament blocks, and a third portion of the non-uniform unsintered layer is defined by a third plurality of filament blocks;
removing substantially all of the binder; and
sintering the unsintered layer to form an abradable layer for the substrate defining the major surface, wherein the first portion of the unsintered layer forms a first portion of the abradable layer, the second portion of the unsintered layer forms a second portion of the abradable layer, the third portion of the unsintered layer forms a third portion of the abradable layer,
wherein each filament block of the first plurality of filament blocks defines a first shape, each filament block of the second plurality of filament blocks defines a second shape, and each filament block of the third plurality of filament blocks defines a third shape, and wherein the third shape is rounded such that the third shape does not include relatively sharp edges, and wherein respective filament blocks of the third plurality of filament blocks are oriented to substantially align with a blade tip of a blade configured to contact a blade rub portion upon rotation of the blade in a circumferential direction.

12. An additive manufacturing system comprising:
a substrate defining a major surface;
a filament delivery device; and
a computing device configured to:
control the filament delivery device to deposit a softened filament on the substrate to form an unsintered layer, the filament including a powder and a binder, wherein the unsintered layer comprises a non-uniform unsintered layer in which a first portion is defined by a first plurality of filament blocks and a second portion of the non-uniform unsintered layer is defined by a second plurality of filament blocks;
wherein the binder is configured to be substantially removed from the filament and the powder includes a metal or an alloy configured to be sintered to form an abradable layer, wherein the first portion of the unsintered layer forms a first portion of the abradable layer and the second portion of the unsintered layer forms a second portion of the abradable layer, and wherein the first portion of the abradable layer defines a different porosity, density, composition, or microstructure than the second portion of the abradable layer.

13. The additive manufacturing system of claim 12, wherein the unsintered layer comprises a continuous unsintered layer in which the continuous unsintered layer is a single unsintered layer.

14. The additive manufacturing system of claim 12, wherein the unsintered layer further comprises third portion defined by a third plurality of filament blocks.

15. The additive manufacturing system of claim 14, wherein each filament block of the first plurality of filament blocks defines a first shape, each filament block of the second plurality of filament blocks defines a second shape, and each filament block of the third plurality of filament blocks defines a third shape, and wherein the third shape is different from at least one of the first shape or the second shape in at least one of a surface area, a perimeter length, or a contour shape.

16. The additive manufacturing system of claim 14, wherein respective filament blocks of the third plurality of filament blocks are oriented to substantially align with a blade tip of a blade configured to contact a blade rub portion upon rotation of the blade in a circumferential direction.

* * * * *